(12) United States Patent
Culcu et al.

(10) Patent No.: US 11,760,814 B2
(45) Date of Patent: Sep. 19, 2023

(54) 1,5 DIAZABICYCLOOCTANE LIGAND SYSTEMS AND METHODS THEREWITH

(71) Applicant: ExxonMobil Chemical Patents Inc., Baytown, TX (US)

(72) Inventors: Gursu Culcu, Humble, TX (US); Catherine A. Faler, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 309 days.

(21) Appl. No.: 17/187,345

(22) Filed: Feb. 26, 2021

(65) Prior Publication Data

US 2021/0284763 A1    Sep. 16, 2021

Related U.S. Application Data

(60) Provisional application No. 62/984,644, filed on Mar. 3, 2020.

(51) Int. Cl.

| | | |
|---|---|---|
| *C07F 7/00* | (2006.01) |
| *C07F 7/28* | (2006.01) |
| *C07F 9/00* | (2006.01) |
| *C08F 4/68* | (2006.01) |
| *C08F 4/76* | (2006.01) |
| *C08F 10/02* | (2006.01) |
| *C07F 5/06* | (2006.01) |
| *C07F 17/00* | (2006.01) |

(52) U.S. Cl.
CPC .............. *C08F 4/76* (2013.01); *C07F 5/069* (2013.01); *C07F 7/003* (2013.01); *C07F 9/005* (2013.01); *C07F 17/00* (2013.01); *C08F 4/68137* (2013.01); *C08F 10/02* (2013.01)

(58) Field of Classification Search
CPC .. C07F 7/003; C07F 7/28; C07F 9/005; C08F 4/64055; C08F 4/68137
See application file for complete search history.

(56) References Cited

U.S. PATENT DOCUMENTS

| | | | |
|---|---|---|---|
| 3,159,647 A | 12/1964 | Poppelsdord | 260/309.7 |
| 3,210,336 A | 10/1965 | Poppelsdord | 260/239 |
| 5,001,205 A | 3/1991 | Hoel | 526/128 |
| 5,153,157 A | 10/1992 | Hlatky et al. | 502/117 |
| 5,453,410 A | 9/1995 | Klothanuner et al. | 502/155 |
| 5,612,271 A | 3/1997 | Zandona | 502/117 |
| 5,942,459 A | 8/1999 | Sugano et al. | 502/117 |
| 6,175,409 B1 | 1/2001 | Nielsen et al. | 356/337 |
| 6,211,105 B1 | 4/2001 | Holtcamp | 502/103 |
| 6,260,407 B1 | 7/2001 | Petro et al. | 73/61.52 |
| 6,294,388 B1 | 9/2001 | Petro | 436/8 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,461,515 B1 | 10/2002 | Safir et al. | 210/656 |
| 6,475,391 B2 | 11/2002 | Safir et al. | 210/656 |
| 6,491,816 B2 | 12/2002 | Petro | 210/198.2 |
| 6,491,823 B1 | 12/2002 | Safir et al. | 210/656 |
| 7,729,536 B2 | 6/2010 | Eguchi et al. | 382/173 |
| 7,812,104 B2 | 10/2010 | Canich et al. | 526/161 |
| 8,008,412 B2 | 8/2011 | Brant et al. | 526/64 |
| 8,058,371 B2 | 11/2011 | Brant et al. | 526/160 |
| 8,658,556 B2 | 2/2014 | Stewart | 502/202 |
| 9,249,239 B2 | 2/2016 | Jian et al. | |
| 2008/0153997 A1 | 6/2008 | Casty et al. | 526/88 |
| 2019/0330139 A1 | 10/2019 | Faler et al. | |
| 2019/0330246 A1 | 10/2019 | Faler et al. | |
| 2020/0017615 A1* | 1/2020 | Faler | C08F 210/16 |

FOREIGN PATENT DOCUMENTS

| | | | |
|---|---|---|---|
| WO | 1994/07928 | 4/1994 | C08F 10/02 |
| WO | 1995/14044 | 5/1995 | C08F 4/02 |
| WO | 1996/33227 | 10/1996 | C08F 210/18 |
| WO | 1997/22639 | 6/1997 | C08F 210/18 |
| WO | 1998/43983 | 10/1998 | C07F 5/02 |

OTHER PUBLICATIONS

Chiari, B. et al. (1988) "Out-of-Plane Coordination and Exchange Coupling in Oxygen-Bridged Copper(II) Dimers," *Inorg. Chem.* v.27(23), pp. 4149-4153.
Elias, H. et al. (2003) "Kinetics and Mechanism of Ligand Substitution in Bis(N-alkylsalicylaldiminato)oxovanadium(IV) Complexes," *Inorg. Chem.*, v.42(9), pp. 2878-2885.
Girolami (1994) "A Simple 'Back of the Envelope' Method for Estimating the Densities and Molecular Volumes of Liquids and Solids," *Journal of Chemical Education*, v.71(11) pp. 962-964.
Greiser, J.; et al. (2018) "N,1,4-Tri(4-alkoxy-2-hydroxybenzyl)-DAZA: efficient one-pot synthesis and labelling with 68Ga for PET liver imaging in ovo.," *Dalton Transactions*, v.47(27), pp. 9000-9007.
Hagen, H. et al. (2000) "Vanadium(IV) and -(V) Complexes with O,N-Chelating Aminophenolate and Pyridylalkoxide Ligands," *Inorg. Chem.*, v.39(18), pp. 3970-3977.
Makio, H. et al. (2011) "FI Catalysts for Olefin Polymerization—A Comprehensive Treatment," *Chem. Rev.*, v.111(3), pp. 2363-2449.
Onishi, Y. et al. (2008) "Synthesis and Structural Analysis of (Arylimido)vanadium(V) Complexes Containing Phenoxyimine Ligands: New, Efficient Catalyst Precursors for Ethylene Polymerization," *Organometallics*, v.27(11), pp. 2590-2596.
Wu, J.-Q. et al. (2008) "Synthesis, Structural Characterization, and Ethylene Polymerization Behavior of the Vanadium(III) Complexes Bearing Salicylaldiminato Ligands," *Organometallics*, v.27(15), pp. 3840-3848.
Wu, J.-Q.; et al. (2010) "Bis(β-enaminoketonato) vanadium (III or IV) complexes as catalysts for olefin polymerization," *J. Polym. Sci., Part A: Polym. Chem.*, v.48(14), pp. 3062-3072.
Yasushi, N. et al. (2003) "Highly Active, Thermally Robust V-based New Olefin Polymerization Catalyst System," *Chem. Lett.*, v.32(8), pp. 766-767.

* cited by examiner

*Primary Examiner* — Caixia Lu

(57) ABSTRACT

This disclosure is generally directed to polymerization catalysts derived from 1,5-diazabicyclooctanes, catalyst systems utilizing such catalysts, and processes to polymerize alpha olefins therewith.

20 Claims, 3 Drawing Sheets

US 11,760,814 B2

1,5 DIAZABICYCLOOCTANE LIGAND SYSTEMS AND METHODS THEREWITH

CROSS REFERENCE TO RELATED APPLICATIONS

This application claims the priority benefit of U.S. Provisional Application No. 62/984,644, filed Mar. 3, 2020, the disclosure of which is incorporated herein by reference.

FIELD OF THE INVENTION

This invention relates to novel catalyst compounds, catalyst systems and methods of controlling polymer properties.

BACKGROUND OF THE INVENTION

Olefin polymerization catalysts are of great use in industry. Hence, there is interest in finding new catalyst systems that increase the commercial usefulness of the catalyst and allow the production of polymers having improved properties. Synthesis of 1,5-diazabicyclooctanes is known (U.S. Pat. Nos. 3,159,647, and 3,210,336). However, bidentate ligands derived from 1,5-diazabicyclooctanes have received very little attention (cf. Greiser, J.; et al. (2018) "N,1,4-Tri(4-alkoxy-2-hydroxybenzyl)-DAZA: efficient one-pot synthesis and labelling with 68Ga for PET liver imaging in ovo.," Dalton Transactions, v. 47 (27), pp. 9000-9007).

Moreover, applicant is aware of only a single example of a transition metal complex, in this case a dimeric copper(II) complex, comprising a 1,5-diazabicyclooctane-based ligand (cf Chiari, B. et al. (1988) "Out-of-Plane Coordination and Exchange Coupling in Oxygen-Bridged Copper(II) Dimers," Inorg. Chem. v. 27 (23), pp. 4149-4153).

There is still a need in the art for new and improved catalyst systems for the polymerization of olefins, in order to achieve improved activities, monomer incorporation, and other polymer properties. It is therefore an object of the present invention to provide novel catalyst compounds, catalysts systems comprising such compounds, and processes for the polymerization of olefins using such compounds and systems.

SUMMARY OF THE INVENTION

This invention relates to a transition metal compound useful for polymerizing ethylene and/or propylene, optionally with at least one additional alpha-olefin comonomer. In one aspect of the invention, the transition metal compound is generally represented by Formula (I):

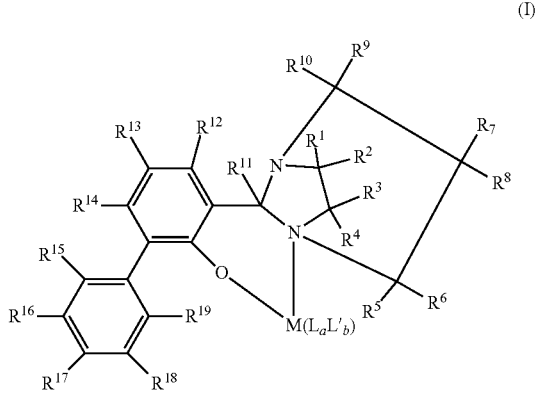

(I)

where:
M is a Group 3-13 metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof; subscript "a" is greater than or equal to 0 and less than or equal to Z−2;
subscript "b" is greater than or equal to 0 and less than or equal to Z−2; and $(Z-2)-(a)-(2b)=0$;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of IV to $R^{19}$ may independently join together to form a $C_4$ to $C_{62}$ cyclic or polycyclic ring structure, or a combination thereof.

The invention further relates to a catalyst system useful for polymerizing ethylene and optionally at least one additional olefin comonomer comprising a transition metal compound according to one or more embodiments disclosed herein, and an activator.

The invention also relates to a process to polymerize one or more $C_2$-$C_{12}$ alpha olefins, in particular ethylene, propylene, or a combination thereof, and optionally including one or more $C_4$-$C_{12}$ olefin, preferably one or more $C_4$-$C_{12}$ alpha olefins, comprising the steps of contacting the alpha olefin and optionally the at least one additional comonomer with a catalyst system according to one or more embodiments disclosed herein under polymerization conditions at a temperature, pressure, and for a period of time sufficient to produce a polyalphaolefin.

DETAILED DESCRIPTION OF THE INVENTION

Figure 1:
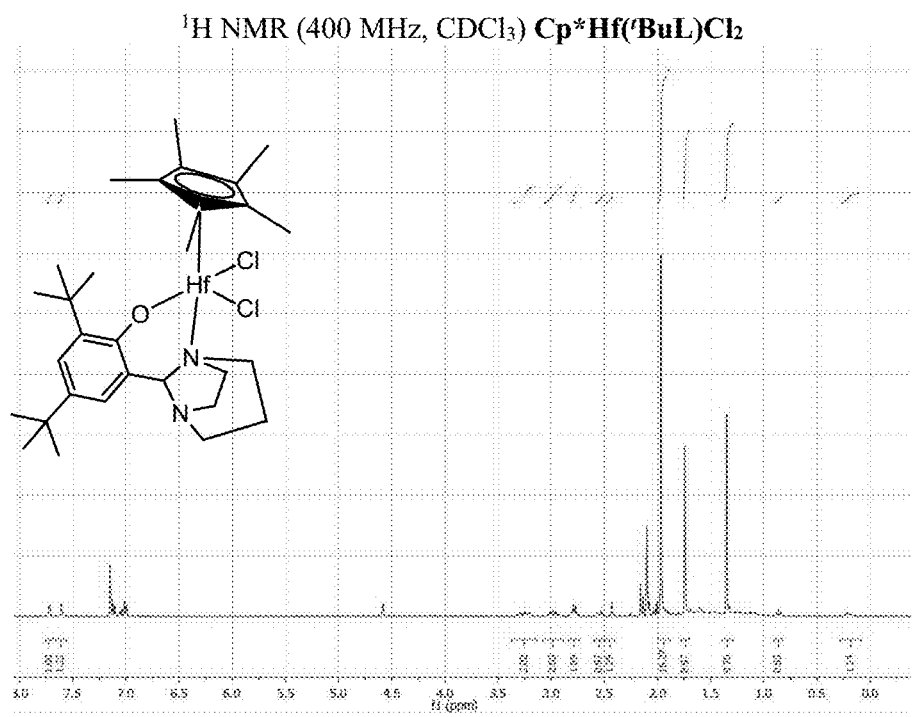
FIG. 1 shows a $^1$H NMR spectrum of a catalyst compound according to embodiments disclosed herein.

For the purposes of this invention and the claims thereto, the new numbering scheme for the Periodic Table Groups is used as described in Chemical and Engineering News, v. 63 (5), p. 27 (1985). Therefore, a "Group 4 metal" is an element from Group 4 of the Periodic Table.

An "olefin," alternatively referred to as an "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized from of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based on a weight of the copolymer. A "polymer" has two or more of the same or different mer units. A "homopolymer" is a polymer having mer units that are the same. A "copolymer" is a polymer having two or more mer units that are different from each other. For the purpose of this disclosure, a copolymer does not include graft copolymers. A "terpolymer" is a polymer having three mer units that are different from each other. A "tetrapolymer" is a polymer having four mer units that are different from each other. Accordingly, the definition of copolymer, as used herein, includes terpolymers, tetrapolymers and the like. "Different" as used to refer to mer units indicates that the mer units differ from each other by at least one atom or are different isomerically.

The terms "alpha-olefin" and "α-olefin" are used interchangeably and refer to an olefin having a terminal carbon-to-carbon double bond in the structure thereof (($R^1R^2$)—C=$CH_2$, where $R^1$ and $R^2$ can independently be hydrogen or any hydrocarbyl group; preferably $R^1$ is hydrogen and $R^2$ is an alkyl group). A "linear alpha-olefin" is an alpha-olefin defined where $R^1$ is hydrogen and $R^2$ is hydrogen or a linear alkyl group. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexene, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes of this disclosure, ethylene is considered to be an α-olefin.

As used herein, and unless otherwise specified, the term "$C_n$" means hydrocarbon(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1.2.3 and 4.

The terms "group," "radical," and "substituent" may be used interchangeably, and are typically represented as "R-groups" in the disclosed chemical structures.

The terms "hydrocarbyl radical," "hydrocarbyl group," or "hydrocarbyl" may be used interchangeably and are defined to mean a group comprising hydrogen and carbon atoms.

Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Unless otherwise indicated, (e.g., the definition of "substituted hydrocarbyl"), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —NR*—CO—R*, —OR*,*—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —$SO_2$—(OR*)$_2$, —BR*$_2$, —SiR*$_3$, —GeR*$_3$, —SnR*$_3$, —PbR*$_3$, —($CH_2$)q-SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g —NR*$_2$, —NR*—CO—R*,—OR*,*—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —$SO_2$—(OR*)$_2$, —BR*$_2$, —SiR*$_3$, —GeR*$_3$, —SnR*$_3$, —PbR*$_3$, —($CH_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group (as further described in the definition of "substituted" herein).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

As used herein, a "catalyst" includes a single catalyst, or multiple catalysts. Catalysts can have isomeric forms such as conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

The following abbreviations may be used herein: Me is methyl, Ph is phenyl, Et is ethyl, Pr is propyl, iPr is isopropyl, n-Pr is normal propyl, cPr is cyclopropyl, Bu is butyl, i-Bu is isobutyl, sBu is secondary butyl, tBu is tertiary butyl, n-Bu is normal butyl, MAO is methylalumoxane, Bn is benzyl (i.e., $CH_2Ph$), RT is room temperature (and is 23° C. unless otherwise indicated), $CF_3SO_3$— is triflate, and cyHx is cyclohexyl.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and an activator. A catalyst system of the present disclosure can further include a support material and an optional co-activator. For the purposes of this disclosure, when a catalyst is described as including neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

An "anionic leaving group" is a negatively charged group that donates one or more pairs of electrons to a metal ion, that can be displaced by monomer or activator.

A "scavenger" is a compound that can be added to a reactor to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator is pre-mixed with the transition metal compound to form an alkylated transition metal compound. Examples of scavengers include trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride, and free-radical scavengers such as antioxidants (e.g., octadecyl 3-(3,5-di-tert-butyl-4-hydroxyphenyl)propionate also referred to as Irganox™ 1076, available from Ciba-Geigy).

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six-carbon aromatic ring, and the substituted variants thereof, including phenyl, 2-methylphenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The terms "aryloxy" and "aryloxide" mean an aryl group bound to an oxygen atom, such as an aryl ether group/radical connected to an oxygen atom and can include those where the aryl group is a $C_1$ to $C_{10}$ hydrocarbyl. Examples of suitable aryloxy radicals can include phenoxy, and the like.

The terms "hydrosilylcarbyl radical," "hydrosilylcarbyl group," or "hydrosilylcarbyl" interchangeably refers to a group consisting of hydrogen, carbon, and silicon atoms only. A hydrosilylcarbyl group can be saturated or unsaturated, linear or branched, cyclic or acyclic, aromatic or non-aromatic, and with the silicon atom being within and/or pendant to the cyclic/aromatic rings.

The term "silyl group," refers to a group comprising silicon atoms, such as a hydrosilylcarbyl group.

A "ring carbon atom" is a carbon atom that is part of a cyclic ring structure. By this definition, a benzyl group has six ring carbon atoms and para-methylstyrene also has six ring carbon atoms.

The term "ring atom" means an atom that is part of a cyclic ring structure. By this definition, a benzyl group has six ring atoms and tetrahydrofuran has 5 ring atoms.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., n-butyl, iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "continuous" means a system that operates without interruption or cessation. For example, a continuous process to produce a polymer would be one where the reactants are continually introduced into one or more reactors and polymer product is continually withdrawn during a polymerization process.

Herein, "catalyst" and "catalyst complex" are used interchangeably.

For purposes herein, suitable hydrocarbyl radicals may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and/or triacontynyl.

For purposes herein, suitable hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbobnyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indobnyl, isobenzofuranyl, isoindolyl, isoquinobnyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates the base structure of the radical (the radical type) and unless explicitly stated otherwise, all other radicals formed when that radical is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Catalyst Compounds

This invention relates to diaza-bicyclooctane catalyst compounds. Useful diaza-bicyclooctane catalyst compounds include those represented by Formula (I):

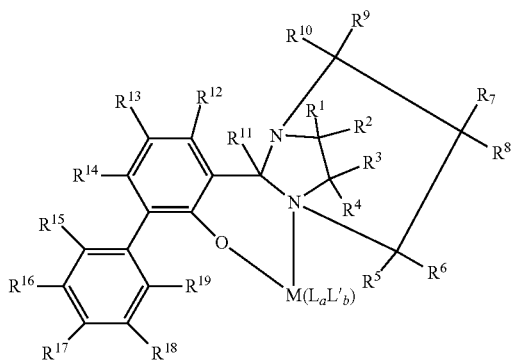

(I)

where:
M is a Group 3-13 metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

subscript "a" is greater than or equal to 0 and less than or equal to Z–2 (such as 1, 2, 3, 4, 5, or 6);

subscript "b" is greater than or equal to 0 and less than or equal to Z–2 (such as 1, 2, 3, 4, 5, or 6; and $$Z-2-(a)-(2b)=0;$$

each of $R^1, R^2, R^3, R^4, R^5, R^6, R^7, R^8, R^9, R^{10}, R^{11}, R^{12}, R^{13}, R^{14}, R^{15}, R^{16}, R^{17}, R^{18}$, and $R^{19}$ is, independently, a hydrogen, a $C_1$-$C_{40}$ hydrocarbyl radical, afunctional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

For brevity, the various embodiments comprising the diaza-bicyclooctane moiety are disclosed such that one of the ring nitrogen atoms is coordinated with the metal M, and the other of the ring nitrogen atoms is a secondary amine (a free amine), as shown in Formula (I).

In an embodiment, the diaza-bicyclooctane catalyst compounds include those represented by Formula (Ia):

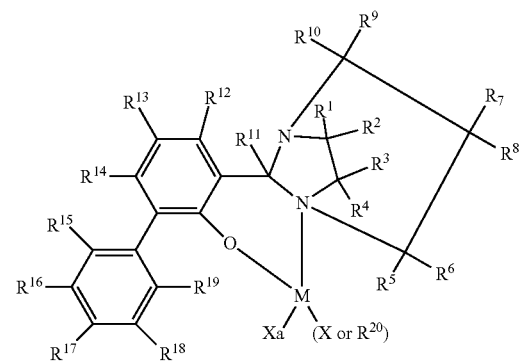

(Ia)

where:
M is a Group 3-13 metal having a valance equal to Z;
each X is a halogen, $C_1$-$C_{10}$ alkyl, benzyl, —$SiR^{\#}_3$, —$CONR^{\#}_2$, —$NR^{\#}_2$, and/or —$OR^{\#}$, wherein each $R^{\#}$ is a $C_1$-$C_{10}$ hydrocarbyl;

subscript "a" is greater than or equal to 0 and less than or equal to Z–2;

each of $R^1, R^2, R^3, R^4, R^5, R^6, R^7, R^8, R^9, R^{10}, R^{11}, R^{12}, R^{13}, R^{14}, R^{15}, R^{16}, R^{17}, R^{18}, R^{19}$, and $R^{20}$ (when present) is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In one or more embodiments, the catalyst compound is represented by Formula (II):

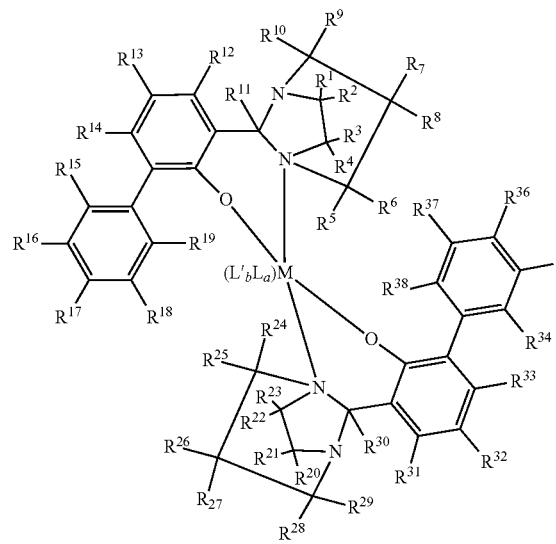

(II)

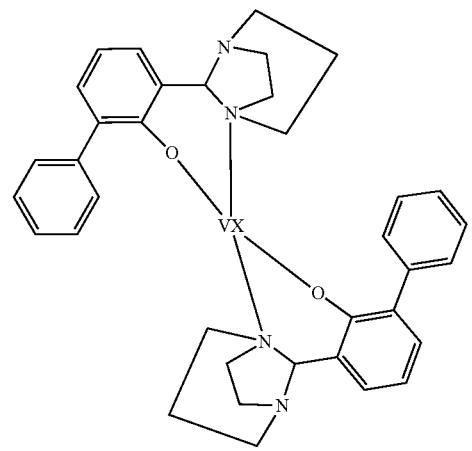

(IIa)

wherein V is vanadium in a 3+ oxidation state, and X is a halogen, $C_1$-$C_{10}$ alkyl, benzyl, —SiR$^\#_3$, —CONR$^\#_2$, —NR$^\#_2$, and/or —OR$^\#$, wherein each R$^\#$ is a $C_1$-$C_{10}$ hydrocarbyl.

In one or more embodiments, the catalyst compound is represented by Formula (IIb):

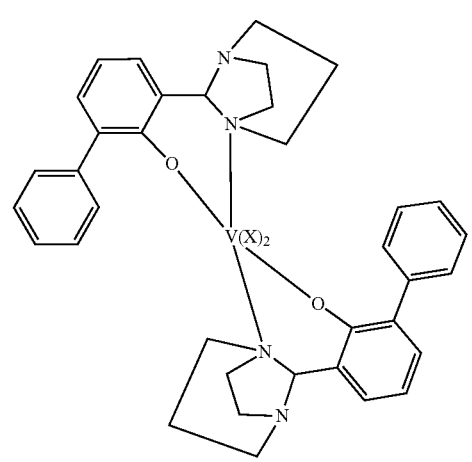

(IIb)

wherein V is vanadium and each X is a halogen, $C_1$-$C_{10}$ alkyl, benzyl, —SiR$^\#_3$, —CONR$^\#_2$, —NR$^\#_2$, and/or —OR$^\#$, wherein each R$^\#$ is a $C_1$-$C_{10}$ hydrocarbyl.

In one or more embodiments, the catalyst compound is represented by Formula (III):

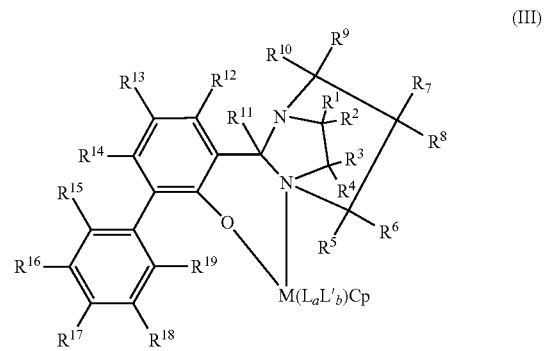

(III)

where:

M is a Group 3-12 transition metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z-4 (such as 1, 2, 3, or 4);

"b" is greater than or equal to 0 and less than or equal to Z-4 (such as 1, 2, 3, or 4);

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$ $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In some embodiments, the catalyst compound is represented by Formula (IIa):

where:

M is a Group 3-12 transition metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z–4 (such as 1, 2, 3, or 4);

"b" is greater than or equal to 0 and less than or equal to Z–4 (such as 1, 2, 3, or 4);

and Z–4–(a)–(2b)=0; and

Cp is a π-bound cyclopentadienyl moiety or substituted cyclopentadienyl moiety;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$, is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In one or more embodiments, the π-bound substituted or unsubstituted cyclopentadienyl (Cp) ligands include substituted or unsubstituted indenyl (Ind), fluorenyl (Flu), tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

The Cp moiety may contain heteroatoms, and may be substituted by one or more R" groups; independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each Cp is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof, preferably cyclopentadienyl, n-propylcyclopentadienyl, indenyl, pentamethylcyclopentadienyl, tetramethylcyclopentadienyl, and n-butylcyclopentadienyl.

In one or more embodiments, the catalyst compound is represented by Formula (IIIa):

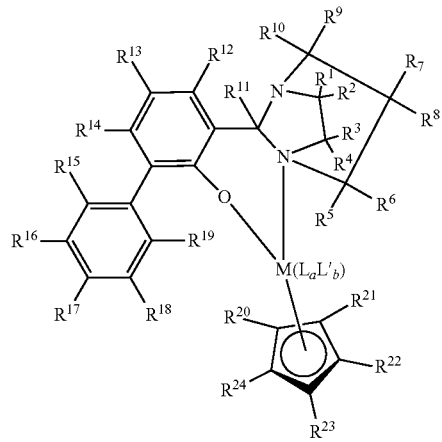

(IIIa)

where:

M is a Group 3-12 transition metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z–4 (such as 1, 2, 3, or 4);

"b" is greater than or equal to 0 and less than or equal to Z–4 (such as 1, 2, 3 or 4); and Z–4–(a)–(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, and $R^{24}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In one or more embodiments, the catalyst compound is represented by Formula (IV):

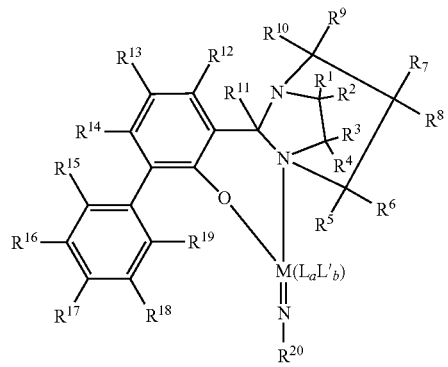

(IV)

where:

M is a Group 3-12 transition metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z-4 (such as 1, 2, 3, or 4);

"b" is greater than or equal to 0 and less than or equal to Z-4 (such as 1, 2, 3, or 4); and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof; and $R^{20}$ is, a $C_1$—C-Ki hydrocarbyl radical, a functional group comprising elements from Group 13-17 of the periodic table of the elements, or a combination thereof.

In one or more embodiments, the catalyst compound is represented by Formula (V):

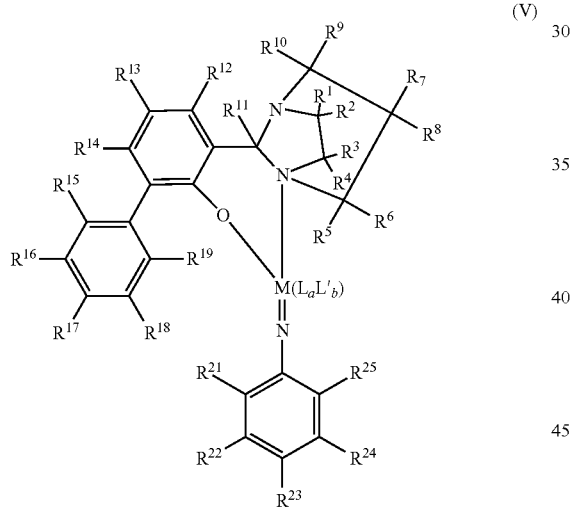

(V)

where:

M is a Group 3-12 transition metal having a valance equal to Z (such as 3, 4, 5, 6, 7, or 8);

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z-4 (such as 1, 2, 3, or 4);

"b" is greater than or equal to 0 and less than or equal to Z-4 (such as 1, 2, 3, or 4);

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{21}$, $R^{22}$, $R^{23}$, $R^{24}$, and $R^{25}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In some embodiments, the catalyst compound is represented by the Formula (Va):

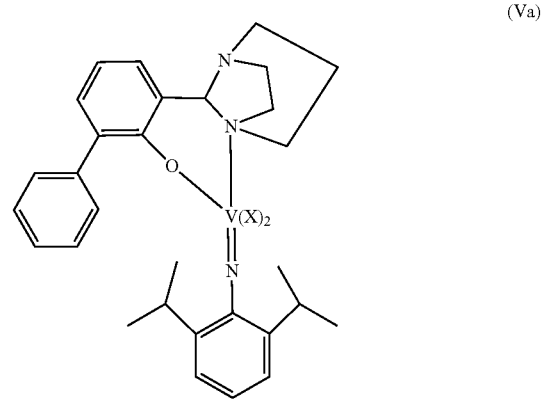

(Va)

wherein V is vanadium and each X is a halogen, $C_1$-$C_{10}$ alkyl, benzyl, —SiR$^\#_3$, —CONR$^\#_2$, —NR$^\#_2$, and/or —OR$^\#$, wherein each $R^\#$ is a $C_1$-$C_{10}$ hydrocarbyl.

In one or more embodiments, the catalyst compound is represented by the Formula (VI):

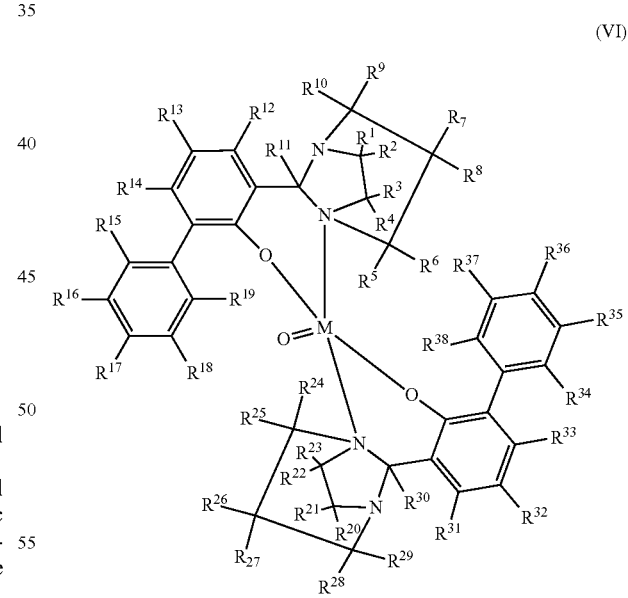

(VI)

where:

M is a Group 5 transition metal; and each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$ $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ and/or two or more of $R^{20}$ to $R^{38}$ may independently join together to form a $C_4$ to $C_{62}$ cyclic or polycyclic ring structure, or a combination thereof.
In one or more embodiments, the catalyst compound is represented by Formula (VIa):
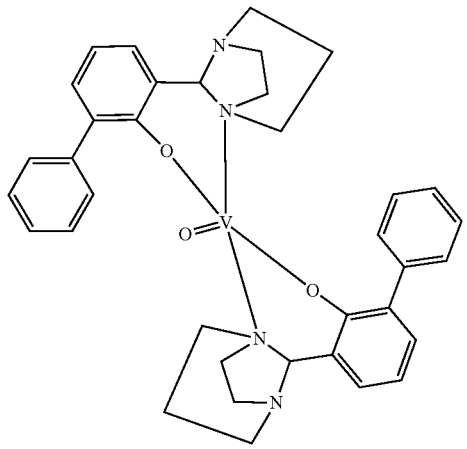
(VIa)
wherein V is vanadium.
Suitable catalyst compounds include those represented by the structures E-I through E-XXI in Table E1 below.
TABLE E1
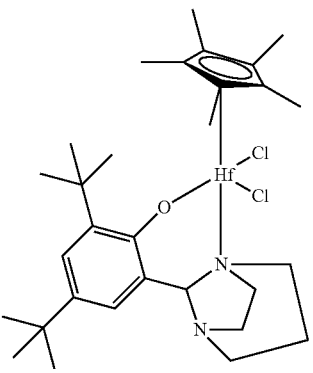
E-I
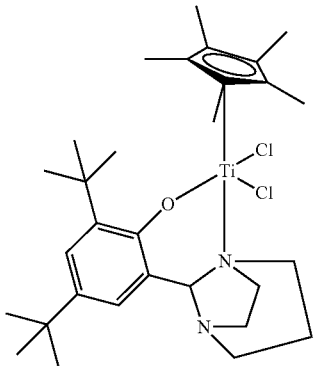
E-II
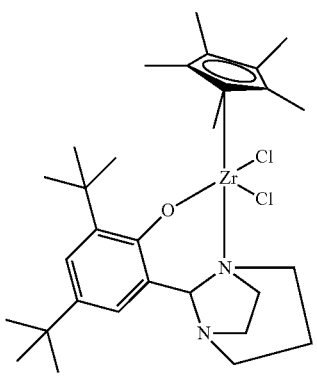
TABLE E1-continued
E-III
E-IV
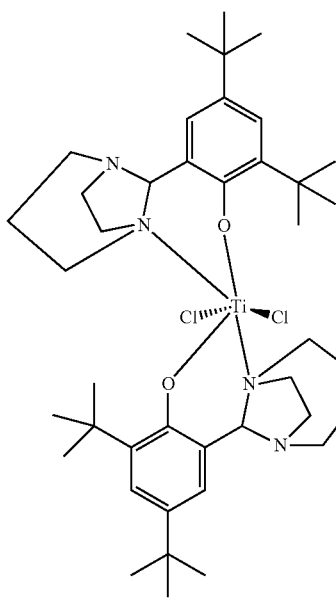
E-V
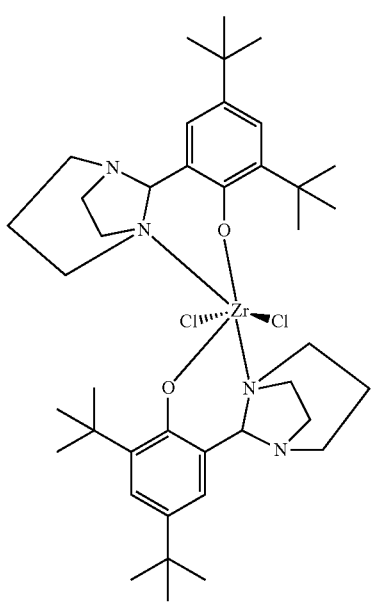

TABLE E1-continued
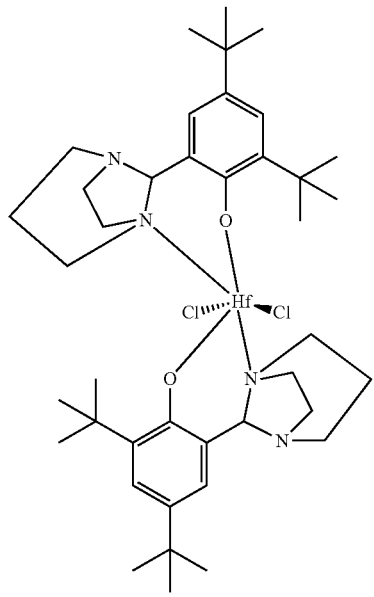
E-VI
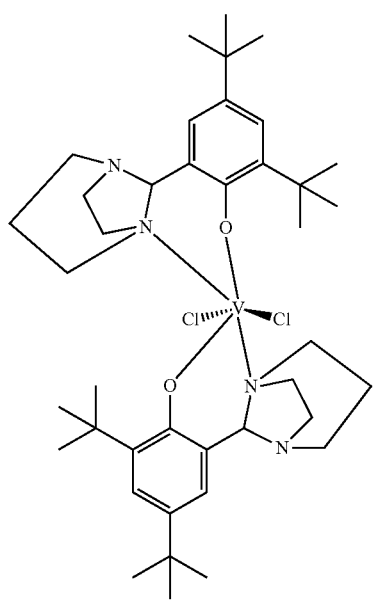
E-VII
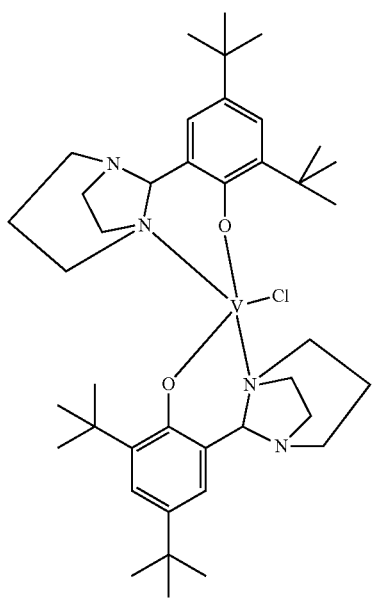
E-VIII
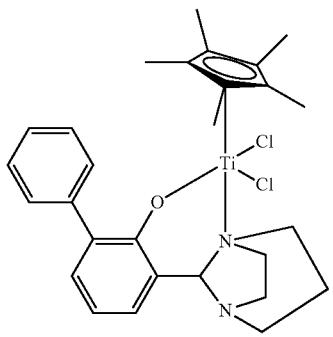
E-IX
E-X TABLE E1-continued
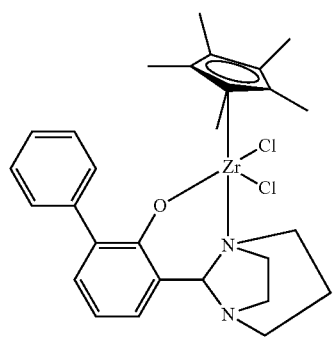
E-XI
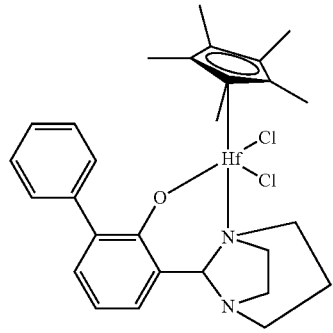
E-XII
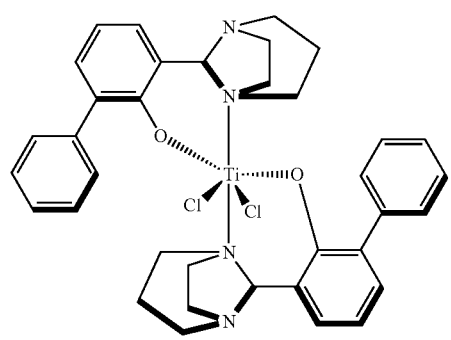
E-XIII
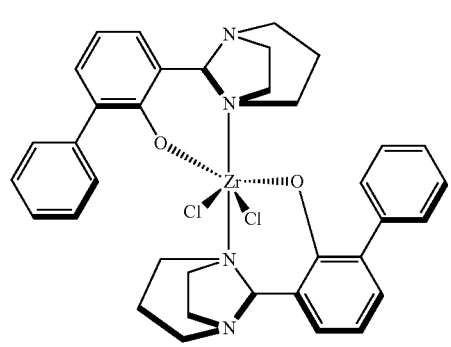
E-XIV
TABLE E1-continued
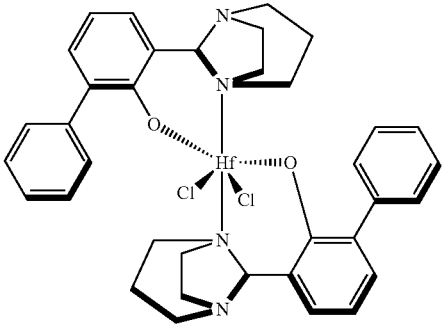
E-XV
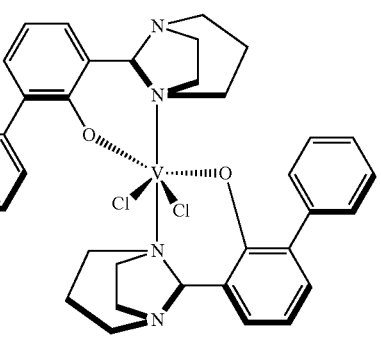
E-XVI
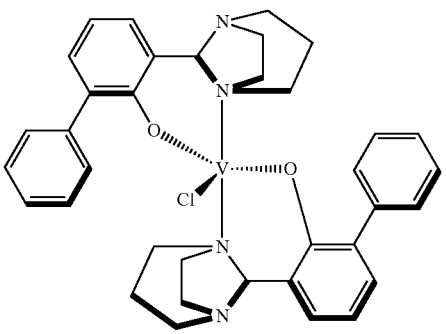
E-XVII
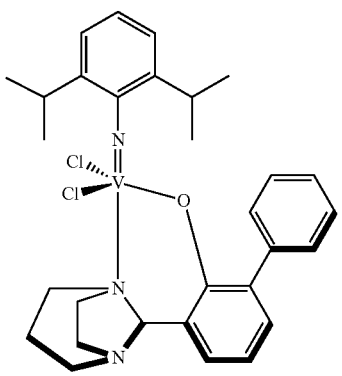
E-XVIII TABLE E1-continued

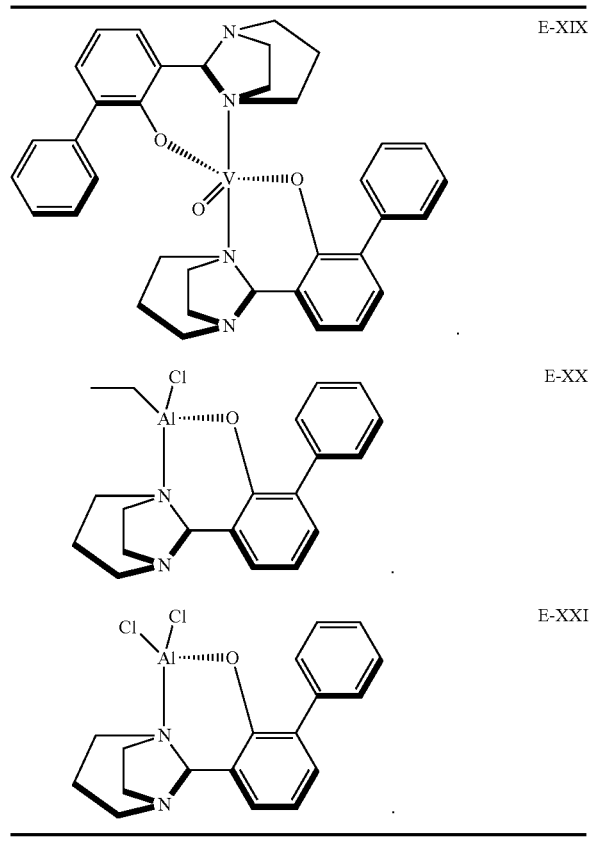

In some embodiments, two or more different catalyst compounds are present in the catalyst system used herein, wherein at least one catalyst compound is according to the instant disclosure. In some embodiments, two or more different catalyst compounds are present in the reaction zone where the process(es) described herein occur. When two transition metal compound-based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds; however, two different activators can be used in combination. If one or more transition metal compounds contain an anionic ligand as a leaving group which is not a hydride, hydrocarbyl, or substituted hydrocarbyl, then the alumoxane or other alkyl aluminum is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percent's, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The terms "co-catalyst" and "activator" are used herein interchangeably and are defined to be a compound which can activate one or more of the catalyst compounds described above by converting the neutral catalyst compound to a catalytically active catalyst compound cation.

After the transition metal complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). Suitable catalyst system may include a complex as described above and an activator such as alumoxane or a non-coordinating anion. In some embodiments, a co-activator is combined with the catalyst compound (such as halogenated catalyst compounds) to form an alkylated catalyst compound. Organoaluminum compounds which may be utilized as co-activators include, for example, trialkyl aluminum compounds, such as trimethylaluminum, triethylaluminum, triisobutylaluminum, tri-n-hexylaluminum, tri-n-octylaluminum, and the like, or alumoxanes. Alkylated catalyst compounds are often used in combination with non-coordinating anion containing activators.

Non-limiting activators, for example, include alumoxanes, aluminum alkyls, ionizing activators, which may be neutral or ionic, and other suitable cocatalysts. Suitable activators may include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. The alkylalumoxane may be used with another activator. Alumoxanes are generally oligomeric compounds containing —Al(R$^1$)—O— sub-units, where R$^1$ is an alkyl group.

Examples of alumoxanes include methyl alumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. In at least one embodiment, a visually clear methylalumoxane can be used. A cloudy or gelled alumoxane can be filtered to produce a clear solution or clear alumoxane can be decanted from the cloudy solution. Suitable alumoxane can be a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another suitable alumoxane is solid polymethylaluminoxane as described in U.S. Pat. Nos. 9,340,630; 8,404,880; and 8,975,209.

When the activator is an alumoxane (modified or unmodified), embodiments may include the maximum amount of activator such as at up to about a 5,000-fold molar excess Al/M over the catalyst compound (per metal catalytic site). The minimum activator-to-catalyst-compound is about a 1:1 molar ratio. Alternate suitable ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. In at least one embodiment, alumoxane is present at about zero mole %, alternately the alumoxane is present at a molar ratio of aluminum to catalyst compound transition metal less than about 500:1, such as less than about 300:1, such as less than about 100:1, such as less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any suitable metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In at least one embodiment, boron containing NCA activators represented by the formula below is used:

$Z_d^+(A^{d-})$ where: Z is (L-H) or a reducible Lewis acid; L is a neutral Lewis base; H is hydrogen; $(L-H)^+$ is a Brønsted acid; $A^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carbenium, ferroceniums and mixtures, such as carbeniums and ferroceniums, such as $Z_d^+$ is triphenyl carbenium. Suitable reducible Lewis acids can be a triaryl carbenium (where the aryl can be substituted or unsubstituted, such as those represented by the formula: $(Ar_3C^+)$, where Ar is aryl substituted with a $C_1$ to $C_{40}$ hydrocarbyl or with a substituted $C_1$ to $C_{40}$ hydrocarbyl, or a heteroaryl substituted with a $C_1$ to $C_{40}$ hydrocarbyl, or with a substituted $C_1$ to $C_{40}$ hydrocarbyl; such as the reducible Lewis acids in "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L-H)_d^+$, such as a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethyl amine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In at least one embodiment, each Q is a fluorinated hydrocarbyl group having 1 to 20 carbon atoms, such as each Q is a fluorinated aryl group, such as each Q is a pentafluoryl aryl group. Examples of suitable $A^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

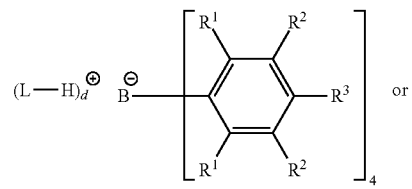

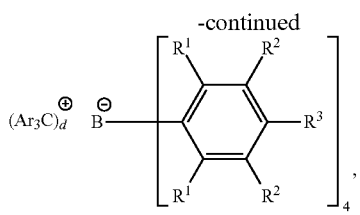

wherein:
each $R^1$ is, independently, a halide, such as a fluoride;
Ar is a substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R^2$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^2$ is a fluoride or a perfluorinated phenyl group);
each $R^3$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^3$ is a fluoride or a $C_6$ perfluorinated aromatic hydrocarbyl group); wherein $R^2$ and $R^3$ can form one or more saturated or unsaturated, substituted or unsubstituted rings (such as $R^2$ and $R^3$ form a perfluorinated phenyl ring);
L is a neutral Lewis base; $(L-H)^+$ is a Brønsted acid; d is 1, 2, or 3;
wherein the anion has a molecular weight of greater than 1,020 g/mol; and
wherein at least three of the substituents on the B atom each have a molecular volume of greater than 250 cubic Å, alternately greater than 300 cubic Å, or alternately greater than 500 cubic Å.

Suitable $(Ar_3C)_d^+$ is $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, v. 71 (11), November 1994, pp. 962-964. Molecular volume (MV), in units of cubic Å, is calculated using the formula: MV=8.3 Vs, where Vs is the scaled volume. Vs is the sum of the relative volumes of the constituent atoms and is calculated from the molecular formula of the substituent using the following table of relative volumes. For fused rings, the Vs is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators as described in U.S. Pat. No. 8,658,556, which is incorporated by reference herein.

In at least one embodiment, one or more of the NCA activators is chosen from the activators described in U.S. Pat. No. 6,211,105.

Suitable activators, such as ionic activators $Z_d^+$ ($A^{d-}$), may include, but are not limited to, one or more of triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate), trialkylammonium tetrakis(pentafluorophenyl)borate, N,N-dialkylanilinium tetrakis(pentafluorophenyl)borate, N,N-dialkyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, dialkylammonium tetrakis(pentafluorophenyl)borate, (where alkyl is methyl, ethyl, propyl, n-butyl, iso-butyl, or t-butyl). In at least one embodiment, the ionic activator $Z_d^+$ ($A^{d-}$) is one or more of N,N-dimethylanilinium tetrakis(perfluorophenyl)borate, triphenylcarbenium tetrakis(perfluorophenyl)borate, $[Me_3NH^+][B(C_6F_5)_4^-]$, 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perluoronaphthyl)borate, triphenylcarbenium tetrakis(perfluorobiphenyl)borate, triphenylcarbenium tetrakis(3,5-bis(trifluoromethyl)phenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, and tropillium tetrakis(perfluoronaphthyl)borate.

Suitable activator-to-catalyst ratio, e.g., all NCA activators-to-catalyst ratio is about aril molar ratio. Alternate suitable ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157; 5,453,410; EP 0573120 B1; WO 1994/007928;

and WO 1995/014044 which discuss the use of an alumoxane in combination with an ionizing activator).

Alternately, a co-activator, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In at least one embodiment, the activator is N,N-dimethylanilinium tetrakis(pentafluorophenyl)borate.

In at least one embodiment, the activator is N,N-dimethylanilinium tetrakis (heptafluoronaphthyl)borate.

In one or more embodiments, a 1 millimole per liter mixture of the activator is soluble in n-hexane, isohexane, cyclohexane, methylcyclohexane, or a combination thereof, i.e., a 1 millimole per liter mixture of the activator forms a clear homogeneous solution in the solvent at 25° C. Suitable examples include those disclosed in US Pat. Pub. 2019-0330246 A1, US 2019-0330139 A1, the disclosures of which are fully incorporated by reference herein.

In embodiments, the activators are represented by the formula:

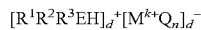

wherein: E is nitrogen or phosphorous; d is 1, 2 or 3; k is 1, 2, or 3; n is 1, 2, 3, 4, 5, or 6; n−k=d; $R^1$ is a $C_1$-$C_{20}$ linear alkyl group; wherein $R^1$ is optionally substituted, each of $R^2$ and $R^3$ is independently an optionally substituted $C_1$-$C_{40}$ linear alkyl group or a meta- and/or para-substituted phenyl group, where the meta and para substituents are, independently, an optionally substituted $C_1$-$C_{40}$ hydrocarbyl group, an optionally substituted alkoxy group, an optionally substituted silyl group, a halogen, or a halogen containing group, wherein $R^1$, $R^2$, and $R^3$ together comprise 15 or more carbon atoms; M is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical. In one or more embodiments, when Q is a fluorophenyl group, then $R^2$ is not a $C_1$-$C_{40}$ linear alkyl group.

In one or more embodiments, $R^1$ is a $C_1$-$C_{10}$ linear alkyl group, preferably hexyl, pentyl, butyl, propyl, ethyl or methyl. In other embodiments, $R^2$ is a meta- and/or para-substituted phenyl group, where the meta and para substituents are, independently, an optionally substituted $C_1$-$C_{40}$ hydrocarbyl group and/or $R^2$ is a $C_1$-$C_{40}$ substituted hydrocarbyl group.

In embodiments, the activators are represented by Formula (AI):

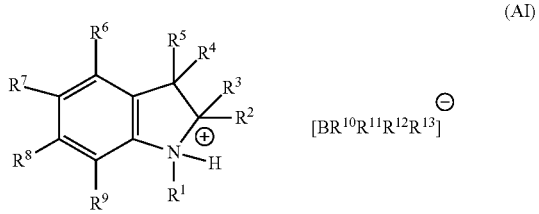

(AI)

wherein: each of $R^1$, $R^2$, $R^3$, $R^4$, $R^5$, $R^6$, $R^7$, $R^8$ and $R^9$ is independently a hydrogen or a $C_1$-$C_{40}$ linear alkyl; $R^1$, $R^2$, $R^3$, $R^4$, $R^5$, $R^6$, $R^7$, $R^8$ and $R^9$ together comprise 6 or more carbon atoms; each of $R^{10}$, $R^{11}$, $R^{12}$, and $R^{13}$ independently comprise an aromatic hydrocarbon having from 6 to 24 carbon atoms; at least one of $R^{10}$, $R^{11}$, $R^{12}$, and $R^{13}$ is substituted with one or more fluorine atoms; and a 1 millimole per liter mixture of the compound in n-hexane, isohexane, cyclohexane, methylcyclohexane, or a combination thereof, forms a clear homogeneous solution at 25° C.

In embodiments, at least one of $R^{10}$, $R^{11}$, $R^{12}$, and $R^{13}$ comprises a perfluoro substituted phenyl moiety, a perfluoro substituted naphthyl moiety, a perfluoro substituted biphenyl moiety, a perfluoro substituted triphenyl moiety, or a combination thereof, preferably perfluoro substituted phenyl radicals, and/or fluoro substituted naphthyl radicals.

In one or more embodiments, $R^1$, $R^4$, and $R^5$ together comprise 3 or more carbon atoms, preferably $R^1$, $R^4$, and $R^5$ together comprise 10 or more carbon atoms.

In one or more embodiments, $R^1$ is a $C_1$-$C_{10}$ linear alkyl radical and $R^4$ is a $C_6$-$C_{40}$ linear alkyl radical. In an alternative embodiment, $R^1$ is a methyl radical and $R^4$ is a $C_6$-$C_{22}$ linear alkyl radical.

In embodiments, a 5 millimole per liter mixture, preferably a 10 millimole per liter mixture of the activator compound according to Formula (AI) in n-hexane, isohexane, cyclohexane, methylcyclohexane, or a combination thereof, forms a clear homogeneous solution at 25° C.

Optional Scavengers, Co-Activators, Chain Transfer Agents

In addition to activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain transfer agents may be used in the compositions and or processes described herein. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 m²/g, pore volume in the range of from about 0.1 to about 4.0 cc/g and average particle size in the range of from about 5 to about 500 μm. More preferably, the surface area of the support material is in the range of from about 50 to about 500 m²/g, pore volume of from about 0.5 to about 3.5 cc/g and average particle size of from about 10 to about 200 μm. Most preferably the surface area of the support material is in the range is from about 100 to about 400 m²/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m2/gm; pore volume of 1.65 cm³/gm). Preferred silicas are marketed under the tradenames of DAVISON™ 952 or DAVISON™ 955 by the Davison Chemical Division of W.R. Grace and Company. In other embodiments DAVISON™ 948 is used.

The support material should be dry, that is, free of absorbed water. Drying of the support material can be affected by heating or calcining at about 100° C. to about 1,000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Preparation of the Catalyst

In embodiments, the 1,5 diazbicyclooctane based ligands (LIII) may be prepared by reacting 1,4 diazacycloheptane (LII), also referred to in the art as homopiperazine, with 2-hydroxy-[1,1'-biphenyl]-3-carbaldehyde i.e., a phenylphenolaldehyde, (LI) to produce the 1,5 diazbicyclooctane based ligands according to the following general reaction pathway (A):

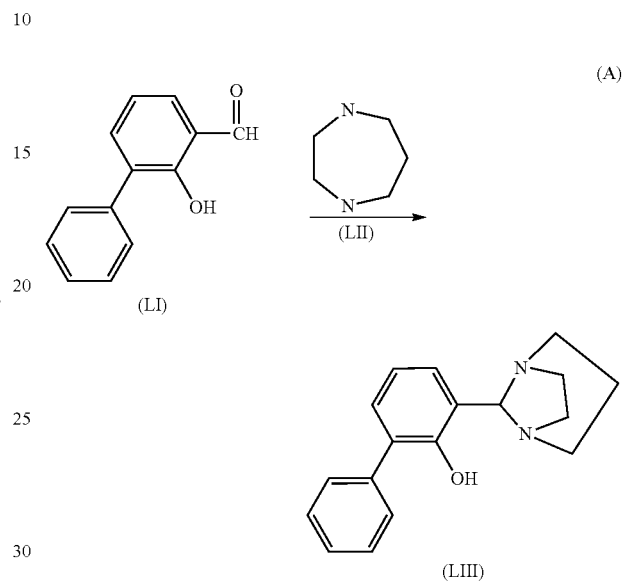

One or more equivalents of the 1,5 diazbicyclooctane phenolic ligand (LIII) may then be reacted with a transition metal compound to form the catalyst.

In one embodiment, a metal (III) complex, e.g., a V(Cl)₃ THF₃ complex, may be reacted with one or two equivalents of the 1,5 diazbicyclooctane phenolic ligand (LIII) as follows:

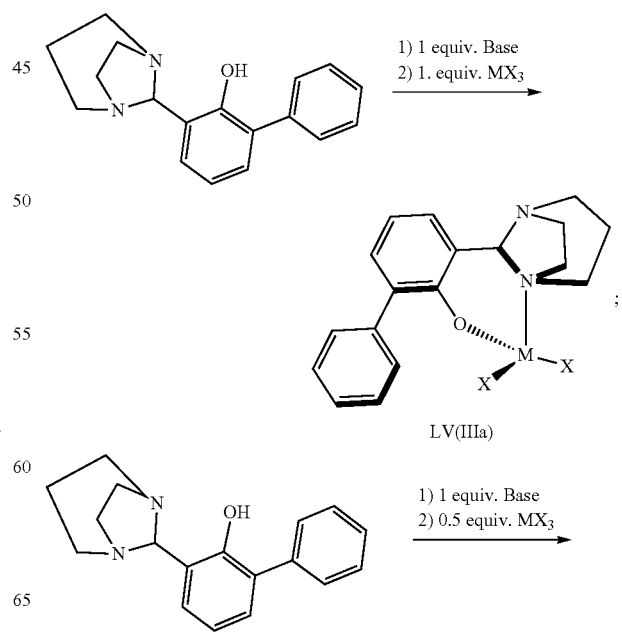

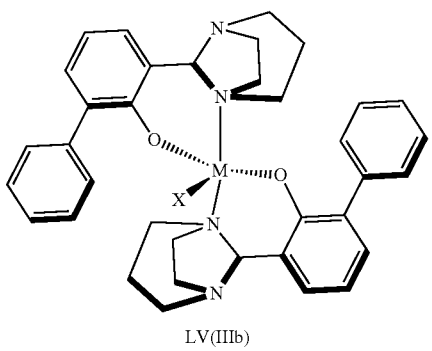

LV(IIIb)

where X may be hydrogen, halogen, $C_1$-$C_{10}$ alkyl, benzyl, —$SiR^{\#}_3$, —$CONR^{\#}_2$, —$NR^{\#}_2$, and/or —$OR^{\#}$ leaving group, wherein each $R^{\#}$ is a $C_1$-$C_{10}$ hydrocarbyl. Suitable bases include nBuLi, NaNTMS, and the like.

In one embodiment, a metal (IV) complex, e.g., $V(C_1)_4$ $THF_2$ complex may be reacted with one or two equivalents of the 1,5 diazbicyclooctane phenolic ligand (LIII) as follows:

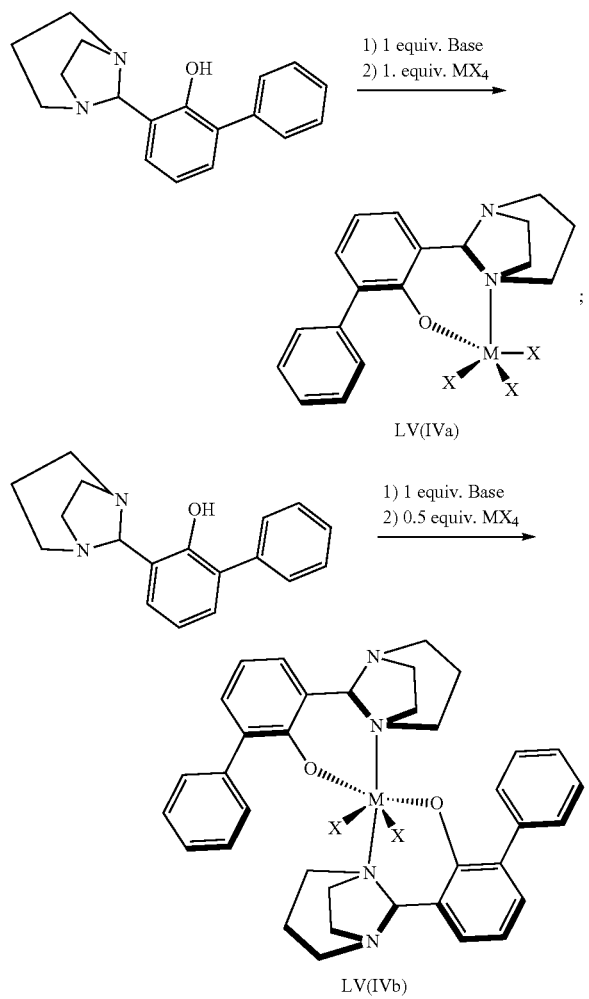

where each X is independently defined as above.

In one or more embodiments, an (arylamide)metal complex, e.g., an (arylamide)vanadium(V) complex such as $ArN{=}VCl_3(dme)$ may be prepared as follows:

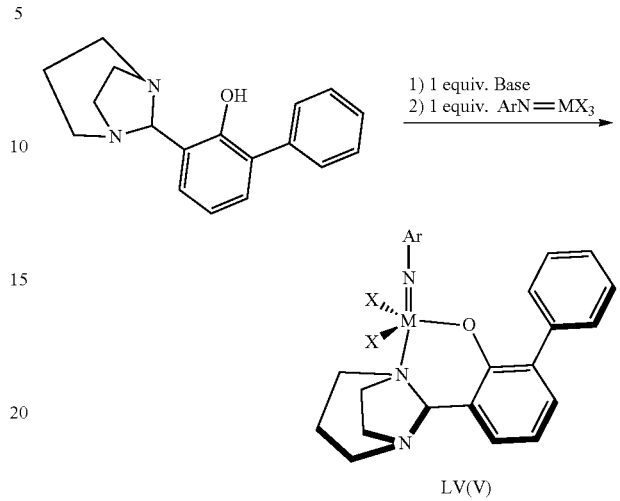

where each X is independently defined as above.

Other suitable reaction pathways include formation of metal-oxo complexes, such as $O{=}VCl_3(THF)$ which may be obtained according to the following reaction pathways:

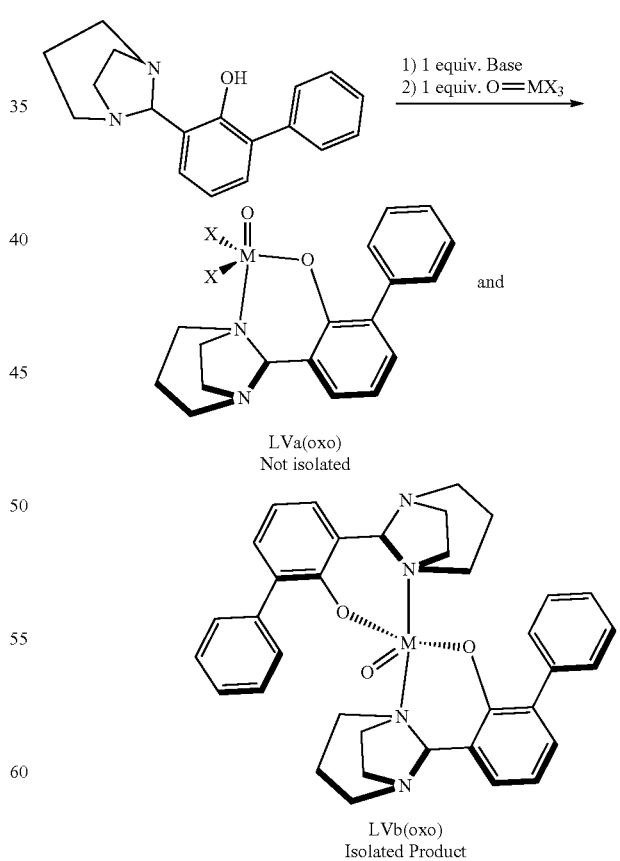

where each X is independently defined as above. It is noted that the LVa(oxo) embodiment was not ultimately isolated.

Group 4 metal complexes comprising a monoligated pentamethyl cyclopentadienyl ligand system (e.g., metallocene embodiments) may be formed according to the following reaction:

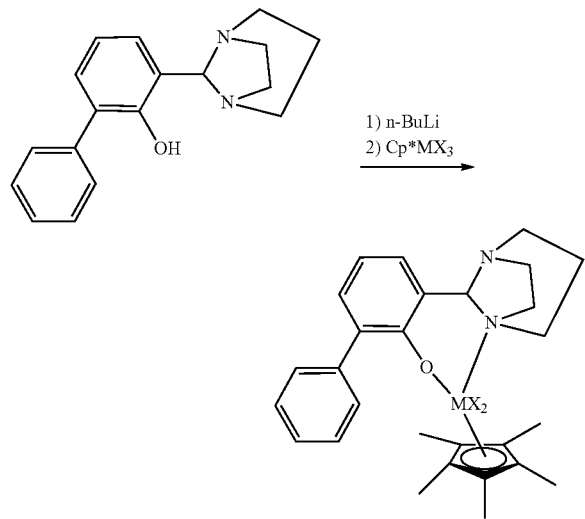

where each X is independently defined as above.

Polymerization Processes

In one or more embodiments, a process for producing a copolymer comprises the steps of contacting one or more $C_2$ to $C_{20}$ olefin monomers with a catalyst system comprising a catalyst compound according to one or more embodiments disclosed herein, an activator, and optionally a support under polymerization conditions at a temperature, a pressure, and for a period of time sufficient to produce the polymer. The general formula of the catalyst compound is represented by Formula (I):

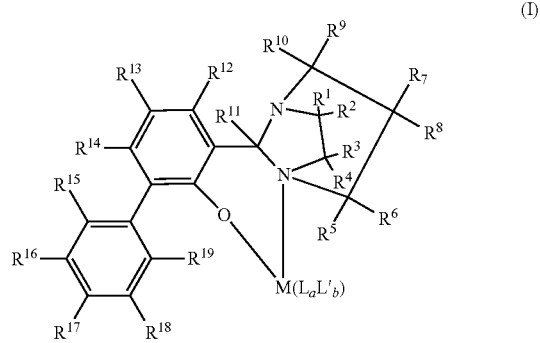

(I)

where:

M is a Group 3-13 metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

"a" is greater than or equal to 0 and less than or equal to Z-2;

"b" is greater than or equal to 0 and less than or equal to Z-2;

and Z-2-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

In a preferred embodiment in any of the processes described herein one catalyst compound according to an embodiment of the instant disclosure is used. For purposes of this invention one catalyst compound is considered different from another if they differ by at least one atom.

In some embodiments, two or more different catalyst compounds are present in the catalyst system used herein, wherein at least one of the catalysts is according to one or more embodiments disclosed herein. In some embodiments, two or more different catalyst compounds are present in the reaction zone where the process(es) described herein occur.

In embodiments herein, the invention relates to polymerization processes where monomer (such as propylene), and optionally comonomer, are contacted with a catalyst system comprising a non-coordinating anion activator and at least one metallocene compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomer comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Polymerization processes of this invention can be carried out in any manner known in the art. Any homogeneous, bulk, solution (including supercritical) phase polymerization process known in the art can be used. Such processes can be run in a batch, semi-batch, or continuous mode. Homogeneous polymerization processes and slurry processes are preferred. A homogeneous polymerization process is defined to be a process where at least 90 wt % of the product is soluble in the reaction media. A homogeneous process is particularly preferred. A bulk process is typically a process where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % or less, preferably 40 vol % or less, or preferably vol % or less, based on the total volume of the feed stream. Preferably, the polymerization is run in a solution process.

Preferred polymerizations can be run at any temperature and/or pressure suitable to obtain the desired polymers. Typical temperatures and/or pressures include a temperature in the range of from about 70° C. to about 300° C., preferably from about 73° C. to about 200° C., preferably from about 75° C. to about 150° C., preferably from about 80° C. to about 120° C., preferably from about 85° C. to about 110° C.; and at a pressure in the range of from about 0.35 MPa to about 10 MPa, preferably from about 0.45 MPa to about 6 MPa, or preferably from about 0.5 MPa to about 4 MPa.

In a typical polymerization, the ethylene is present in the polymerization reactor at a partial pressure of 0 to 1,000 psig (0 to 6,900 kPa), 5 to 300 psig (34 to 2,068 kPa), more preferably 10 to 100 psig (69 to 690 kPa).

In a typical polymerization, the run time (also referred as residence time) of the reaction is up to 300 minutes, preferably in the range of from about 5 to 250 minutes, or preferably from about 10 to 120 minutes.

In another embodiment of the invention, the polymerization temperature is preferably from about 70° C. to about 130° C., preferably from about 80° C. to about 125° C., preferably from about 90° C. to about 120° C., preferably from about 95° C. to about 110° C. and the polymerization process is a homogeneous process, preferably a solution process.

In some embodiments, hydrogen is present in the polymerization reactor at a partial pressure of 0.001 to 50 psig (0.007 to 345 kPa), preferably from 0.01 to 25 psig (0.07 to 172 kPa), more preferably from 0.1 to 10 psig (0.7 to 70 kPa). In some embodiments, hydrogen is not added the polymerization reactor, i.e., hydrogen may be present from other sources, such as a hydrogen generating catalyst, but none is added to the reactor.

In an embodiment of the invention, the activity of the catalyst is at least 50 g/mmol/hour, preferably 500 g/mmol/hour or more, preferably 5,000 g/mmol/hr or more, preferably 50,000 g/mmol/hr or more, preferably 100,000 g/mmol/hr or more, preferably 150,000 g/mmol/hr or more, preferably 200,000 g/mmol/hr or more, preferably 250,000 g/mmol/hr or more, preferably 300,000 g/mmol/hr or more, preferably 350,000 g/mmol/hr or more. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

Alternatively, the inventive catalysts have catalyst activity greater than or equal to about 100 g polymer per g of catalyst, or 500 g polymer per g of catalyst, or 1,000 g polymer per g of catalyst, or 10,000 g polymer per g of catalyst, or 100,000 g polymer per g of catalyst, or 500,000 g of polymer per g of catalyst, or 1,000,000 g of polymer per g or catalyst, or more, when polymerization occurs in a continuous process.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 70° C. to 130° C. (preferably 80° C. to 120° C., preferably 85° C. to 120° C.); 2) is conducted at a pressure of atmospheric pressure to 10 MPa (preferably from 0.35 to 10 MPa, preferably from 0.45 to 6 MPa, preferably from 0.5 to 4 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) ethylene is present in the polymerization reactor at a partial pressure of 0 to 1,000 psig (0 to 6,900 kPa), preferably to 300 psig (34 to 2,068 kPa), more preferably 10 to 100 psig (69 to 690 kPa); 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally, scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, chain transfer agents (such as diethyl zinc or hydrogen), reducing agents, oxidizing agents, hydrogen, aluminum alkyls, or silanes.

Solution Phase Polymerization

As used herein, the phrase "solution phase polymerization" refers to a polymerization system where the polymer produced is soluble in the polymerization medium under the reaction condition. Generally, this involves polymerization in a continuous reactor in which the polymer formed, and the starting monomer and catalyst materials supplied, are agitated to reduce or avoid concentration gradients and in which the monomer acts as a solvent or in which a hydrocarbon is used as solvent. Suitable processes typically operate at temperatures from about 60° C. to about 250° C., preferably from about 80° C. to about 200° C., preferably from about 80° C. to about 150° C., more preferably from about 90° C. to about 140° C., more preferably from about 95° C. to about 120° C. and at pressures of about 0.1 MPa or more, preferably 2 MPa or more. The upper pressure limit is not critically constrained but typically can be about 200 MPa or less, preferably 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

In a preferred embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution.

Preferably, in a continuous process, the mean residence time in the reactor generally can be from about 5 minutes to about 8 hours, and preferably from about 10 minutes to about 6 hours, more preferably from 10 minutes to 1 hour. In some embodiments, comonomer (such as ethylene) can be added to the reaction vessel in an amount to maintain a differential pressure in excess of the combined vapor pressure of the main monomer (such as a propylene) and any optional diene monomers present.

The processes discussed and described herein can be carried out in continuous stirred tank reactors, batch reactors, or plug flow reactors. One reactor can be used even if sequential polymerizations are being performed, preferably as long as there is separation in time or space of the two reactions. Likewise, two or more reactors, operating in series or parallel, can also be used. These reactors can have, or not have, internal cooling and the monomer feed may or may not be refrigerated. See the general disclosure of U.S. Pat. No. 5,001,205 for general process conditions. See also, WO 1996/033227 and WO 1997/022639.

Supercritical or Super Solution Polymerization

In aspects of the invention, the processes and/or catalyst compositions disclosed herein may be used in a supercritical or super solution phase. A supercritical polymerization means a polymerization process is operated at or above supercritical state. In super critical state, the polymerization system is in a dense fluid (i.e., its density is 300 kg/m$^3$ or higher), supercritical state. The terms "dense fluid" and "supercritical state" are defined in U.S. Pat. No. 7,812,104. A super solution polymerization is referred as a process where the monomer concentration in the polymerization reactor is high. Super solution polymerization can occur at a temperature of 65° C. to 150° C., preferably from about 75° C. to about 140° C., preferably from about 90° C. to about 140° C., more preferably from about 100° C. to about 140° C., and at pressures of between 1.72 MPa and 35 MPa, preferably between 5 and 30 MPa. For further information on supercritical and super solution polymerizations, please see U.S. Pat. Nos. 7,812,104; 8,008,412; 7,812,104; 9,249,239; 7,729,536; 8,058,371; and US 2008/0153997.

Polyolefin Products

This invention also relates to compositions of matter produced by the methods described herein.

In a preferred embodiment, the process described herein produces propylene homopolymers or propylene copolymers, such as propylene-ethylene and/or propylene-alpha-olefin (preferably $C_4$ to $C_{20}$) copolymers (such as propylene-hexene copolymers or propylene-octene copolymers), preferably having: an Mw/Mn of greater than 1 to 6 (preferably greater than 2 to 4). Alternatively, the Mw/Mn is less than 4, less than 3, or less than 2.5.

Likewise, the process of this invention produces olefin polymers, preferably polypropylene homopolymers and copolymers. In a preferred embodiment, the polymers produced herein are homopolymers of propylene, are copolymers of propylene preferably having from 0 to 50 mol % (alternately from 0.5 to 25 mol %, alternately from 0.5 to 20 mol %, alternately from 1 to 15 mol %, preferably from 3 to 10 mol %) of one or more of ethylene or $C_4$ to $C_{20}$ olefin comonomer (preferably ethylene or $C_4$ to $C_{12}$ alpha-olefin, preferably ethylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the polymer comprises propylene and from about 1 wt % to about 40 wt % ethylene, based on the total amount of the polymer, and has an Mw of greater than or equal to about 48,000 g/mol, preferably greater than or equal to about 60,000 g/mol, preferably greater than or equal to about 60,000 g/mol, preferably greater than or equal to about 80,000 g/mol, preferably greater than or equal to about 90,000 g/mol, preferably greater than or equal to about 100,000 g/mol, preferably greater than or equal to about 110,000 g/mol, as determined by GPC-4D. In one or more embodiments, the polymer is a comonomer comprising propylene and ethylene, wherein the polymer comprises greater than or equal to about 3 wt % to about 40 wt % ethylene, based on the total amount of the polymer, and has an Mw of greater than or equal to about 100,000 g/mol or more, as determined by GPC-4D.

Typically, the polymers produced herein have an Mw/Mn (as measured by GPC-4D) of greater than 1 to 40, preferably 1 to 20, preferably 1.1 to 15, preferably 1.2 to 10, preferably 1.3 to 5, preferably 1.4 to 4, preferably 1.8 to 3.

In a preferred embodiment, the polymer produced herein has a unimodal or multimodal molecular weight distribution as determined by Gel Permeation Chromatography (GPC). By "unimodal" is meant that the GPC trace has one peak. By "multimodal" is meant that the GPC trace has at least two peaks or more than three inflection points. An inflection point is that point where the second derivative of the curve changes in sign (e.g., from negative to positive or vice versus).

The polymer produced herein can have a melting point (Tm, DSC peak in second melt) of at least 10° C., or at least 20° C., or at least 30° C., or at least 50° C., or at least 60° C. For example, the polymer can have a melting point from at least 10° C. to about 130° C. Alternatively, the polymer produced herein has a melting temperature of 10° C. or less, preferably 5° C. or less. In another embodiment, the polymer produced herein is amorphous without measurable melting temperature.

The polymer produced herein can have a melt flow rate (MFR, ASTM 1238, 2.16 kg, 230° C.) from a low of about 0.1 dg/min, about 0.2 dg/min, about 0.5 dg/min, about 1 dg/min, about 15 dg/min, about 30 dg/min, or about 45 dg/min to a high of about 200 dg/min, about 300 dg/min, about 500 dg/min, or about 1500 dg/min.

In one embodiment, the polymer produced herein has log chain branched architecture with a branching index ($g'_{vis}$) of 0.97 or less, preferably 0.95 or less.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer produced herein is present in the above blends, at from 10 to 99 wt %, based upon the weight of the polymers in the blend, preferably to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing propylene polymers or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film, or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Having described the various aspects of the compositions herein, further specific embodiments of the invention include those set forth in the following paragraphs:

E1. A catalyst compound represented by the Formula (I):

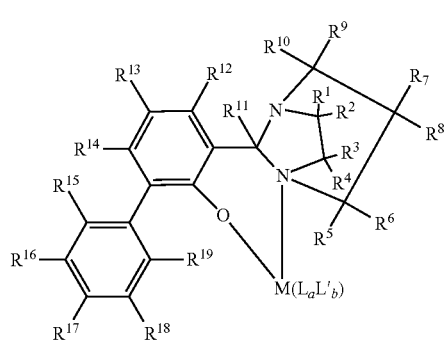

(I)

where:
M is a Group 3-13 metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-2;
b is greater than or equal to 0 and less than or equal to Z-2;
and Z-2-(a)-(2b)=0;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

E2. The catalyst compound according to embodiment E1, wherein M is a metal selected from Groups 4, 5 or 13 of the periodic table of the elements.

E3. The catalyst compound according to embodiment E1 or E2, wherein M is Ti, Hf, Zr, or V.

E4. The catalyst compound according to any one of embodiments E1 through E3, represented by the Formula (II):

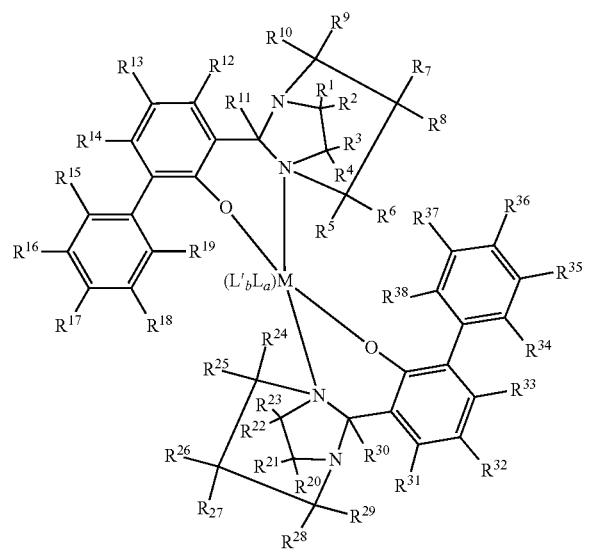

(II)

where:
M is a Group 3-12 transition metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-4;
b is greater than or equal to 0 and less than or equal to Z-4;
and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$ $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

E5. The catalyst compound according to any one of embodiments E1 through E3, represented by the Formula (IIa):

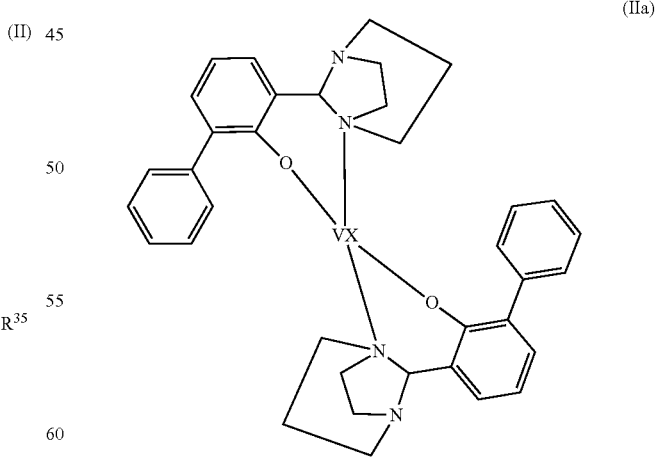

(IIa)

wherein V is vanadium in a 3+ oxidation state, and X is a halogen, $C_1$-$C_{10}$ alkyl, benzyl, —SiR$^\#_3$, —CONR$^\#_2$, —NR$^\#_2$, and/or —OR$^\#$, wherein each R$^\#$ is a $C_1$-$C_{10}$ hydrocarbyl.

E6. The catalyst compound according to any one of embodiments E1 through E3, represented by the Formula (IIb):

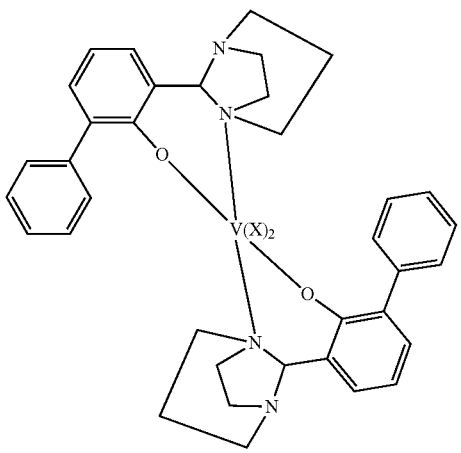

(IIb)

wherein V is vanadium and each X is a halogen, $C_1$-$C_{10}$ alkyl, benzyl, —$SiR^{\#}_3$, —$CONR^{\#}_2$, —$NR^{\#}_2$, and/or —$OR^{\#}$, wherein each $R^{\#}$ is a $C_1$-$C_{10}$ hydrocarbyl.

E7. The catalyst compound according to any one of embodiments E1 through E3, represented by the Formula (III):

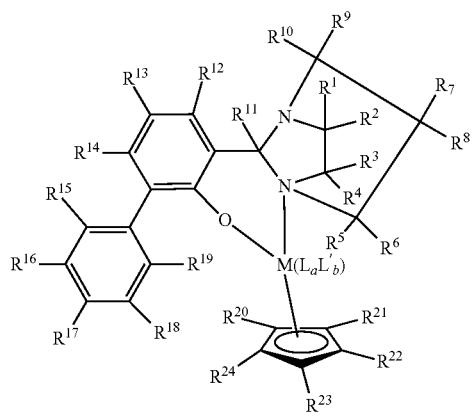

(III)

where:

M is a Group 3-12 transition metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-4;

b is greater than or equal to 0 and less than or equal to Z-4;

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, and $R^{24}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

E8. The catalyst compound according to any one of embodiments E1 through E3, represented by the Formula (IV):

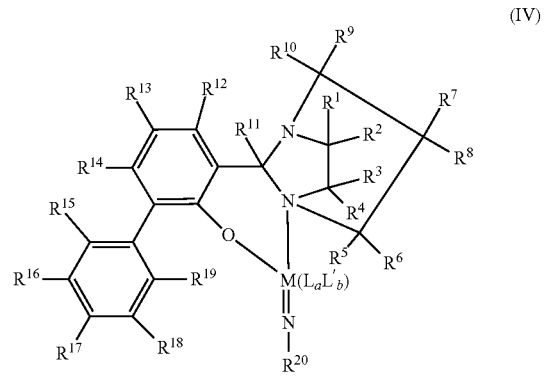

(IV)

where:

M is a Group 3-12 transition metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-4;

b is greater than or equal to 0 and less than or equal to Z-4;

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, afunctional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof; and $R^{20}$ is, a $C_1$-$C_{40}$ hydrocarbyl radical, a functional group comprising elements from Group 13-17 of the periodic table of the elements, or a combination thereof.

E9. The catalyst compound according to any one of embodiments E1 through E3, represented by the Formula (V):

(V)

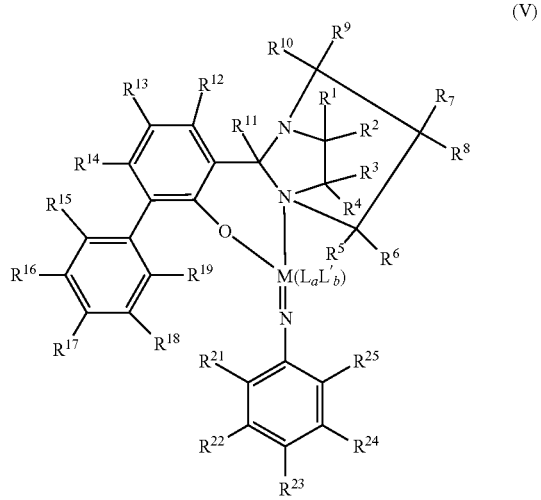

where:

M is a Group 3-12 transition metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-4;

b is greater than or equal to 0 and less than or equal to Z-4;

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{21}$, $R^{22}$, $R^{23}$, $R^{24}$, and $R^{25}$ is, independently, a hydrogen, a $C_1$-$C_{40}$ hydrocarbyl radical, a functional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

E10. The catalyst compound according to any one of embodiments E1 through E3, represented by the Formula (Va):

(Va)

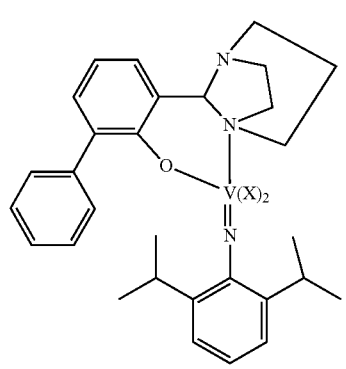

wherein V is vanadium and each X is a halogen, $C_1$-$C_{10}$ alkyl, benzyl, —$SiR^{\#}_3$, —$CONR^{\#}_2$, —$NR^{\#}_2$, and/or —$OR^{\#}$, wherein each $R^{\#}$ is a $C_1$-$C_{10}$ hydrocarbyl.

E11. The catalyst compound according to any one of embodiments E1 through E3, represented by the Formula (VI):

(VI)

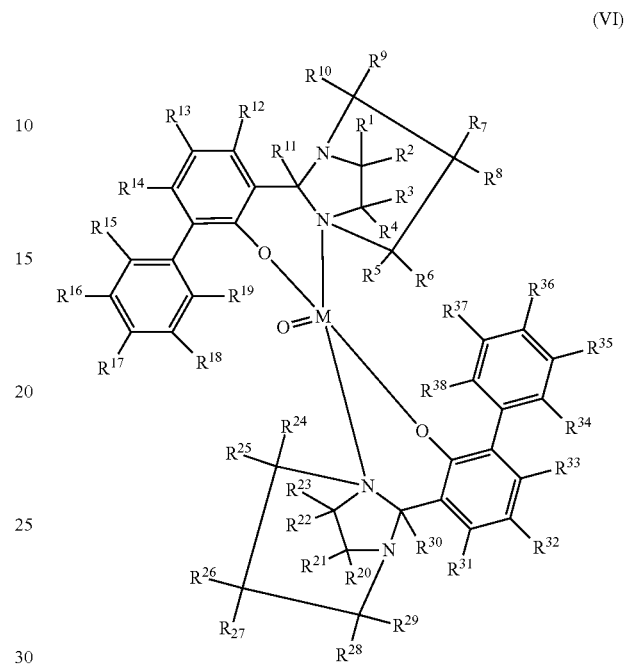

where:

M is a Group 5 transition metal; and each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ and/or two or more of $R^{20}$ to $R^{38}$ may independently join together to form a $C_4$ to $C_{62}$ cyclic or polycyclic ring structure, or a combination thereof.

E12. The catalyst compound according to any one of embodiments E1 through E3, represented by the Formula (Via):

(VIa)

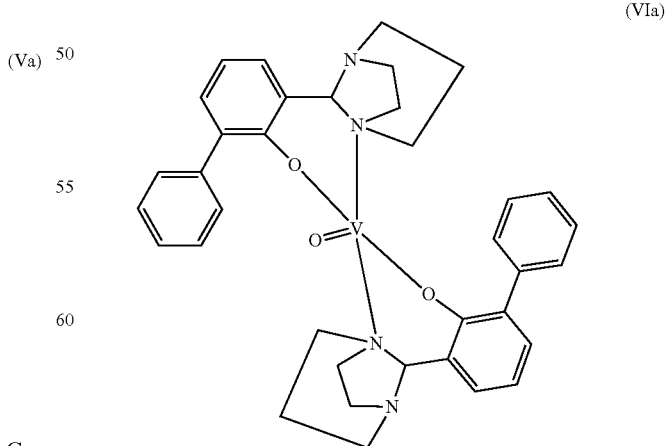

wherein V is vanadium.

E13. The catalyst compound according to any one of embodiments E1 through E12, disposed on a support.

E14. A process for producing a copolymer, comprising: contacting one or more $C_2$ to $C_{20}$ olefin monomers with a catalyst system comprising a catalyst compound according to any one of embodiments E1 through E13, an activator, and optionally a support at a temperature, a pressure, and for a period of time sufficient to produce the polymer.

E15. A process for producing a copolymer, comprising: contacting one or more $C_2$ to $C_{20}$ olefin monomers with a catalyst system comprising a catalyst compound, activator, and optionally a support at a temperature, a pressure, and for a period of time sufficient to produce the polymer, the catalyst compound represented by Formula (I):

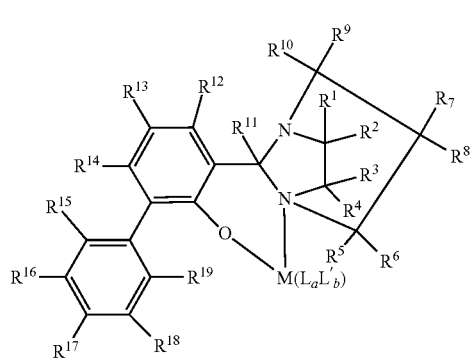

where:

M is a Group 3-13 metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-2;

b is greater than or equal to 0 and less than or equal to Z-2;

and Z-2-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, afunctional group comprising elements from Group 13-17 of the periodic table of the elements, or two or more of $R^1$ to $R^{19}$ may independently join together to form a $C_4$ to $C_{62}$ cyclic or polycyclic ring structure, or a combination thereof.

E16. The process according to embodiment E14 or E15, wherein the catalyst, the activator, or both are disposed on a support.

E17. The process according to any one of embodiments E14 through E16, wherein the support comprises silica, alumina, clay, or a combination thereof.

E18. The process according to any one of embodiments E14 through E17, wherein the activator comprises alumoxane, a non-coordinating anion activator, or a combination thereof.

E19. The process according to any one of embodiments E14 through E18, wherein the activator comprises alumoxane and the alumoxane is present at a ratio of 1 mole aluminum or more to mole of catalyst compound.

E20. The process according to any one of embodiments E14 through E19, wherein the activator is represented by the formula:

$(Z)_d^+(A^{d-})$ wherein Z is (L-H), or a reducible Lewis Acid, wherein L is a neutral Lewis base;

H is hydrogen;

$(L-H)^+$ is a Bronsted acid;

$A^{d-}$ is a non-coordinating anion having the charge d−; and d is an integer from 1 to 3.

E21. The process according to any one of embodiments E14 through E20, wherein the activator is represented by the formula:

$(Z)_d^+(A^{d-})$ wherein $A^{d-}$ is a non-coordinating anion having the charge d−;

d is an integer from 1 to 3, and

Z is a reducible Lewis acid represented by the formula: $(Ar_3C^+)$, where Ar is aryl radical, an aryl radical substituted with a heteroatom, an aryl radical substituted with one or more $C_1$ to $C_{40}$ hydrocarbyl radicals, an aryl radical substituted with one or more functional groups comprising elements from Groups 13-17 of the periodic table of the elements, or a combination thereof.

E22. The process according to any one of embodiments E14 through E21, wherein the activator is selected from the group consisting of:
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(tert-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(tert-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-tert-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(tert-butyl)ammonium tetraphenylborate, N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri (n-butyl)ammonium tetrakis-(2,3,4,6-tetrafluoro-phenyl)borate,
dimethyl(tert-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethyl ammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri (n-butyl)ammonium tetrakis(3,5-bis(trifluoromethyl)phenyl)borate,
tri (tert-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl) borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine,
triphenylcarbenium tetrakis(3,5-bis(trifluoromethyl)phenyl)borate), and combinations thereof.

E23. The process according to any one of embodiments E14 through E22, wherein the olefin comprises from 2 to 12 carbon atoms.

E24. The process according to any one of embodiments E14 through E23, wherein the catalyst activity is greater than or equal to about 100 g(polymer)/g(catalyst).

E25. The process according to any one of embodiments E14 through E24, wherein the polymer produced comprises a Mw of greater than or equal to about 100,000 g/mol, a polydispersity of less than 10, or a combination thereof.

EXAMPLES

The foregoing discussion can be further described with reference to the following non-limiting examples.

Transition metal compounds according to the general formula:

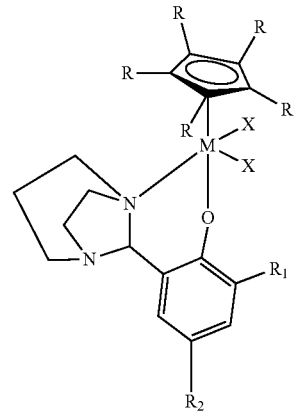

were prepared by dissolving one equivalent of the ligand in toluene or diethyl ether and cooling the solution to about −30° C. Using an autopipette, benzylmagnesium chloride, ″BuLi or the like (one equivalent) was then added and the solution was left stirring at room temperature for about one hour. The solution was then cooled again to about −30° C. and one equivalent of the desired CpMCl₃ was added as solid and the mixture stirred for about 16 hours. The solution was then filtered, and the solvent removed in vacuo. The solids obtained were then washed with a minimum amount of pentane and once again dried in vacuo to produce the transition metal compound.

Transition metal compounds according to the general formula:

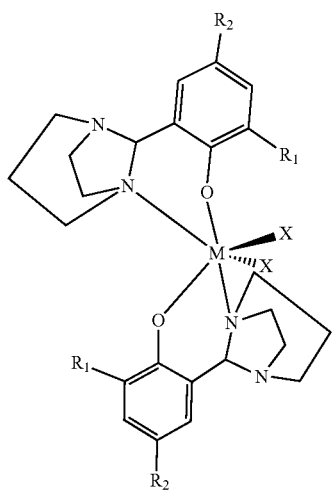

were prepared by dissolving two equivalents of the ligand in toluene, dichloromethane, or diethyl ether and cooling the solution to about −30° C. Using an autopipette, benzylmagnesium chloride, ″BuLi or the like (two equivalents) was then added and the solution was left stirring at room temperature for about one hour. The solution was then cooled again to about −30° C. and one equivalent of the desired MCl$_4$ or MCl$_4$(solvent)$_2$ adduct (e.g., TiCl$_4$, ZrCl$_4$(Et$_2$O)$_2$, HfCl$_4$(Et$_2$O)$_2$, TiCl$_4$(THF)$_2$, VCl$_4$(THF)$_2$ and the like) was added as solid and the mixture stirred for about 16 hours. The solution was then filtered and the solvent removed in vacuo.

The solids obtained were then washed with a minimum amount of pentane and once again dried in vacuo to produce the transition metal compound.

Transition metal compounds according to the general formula:

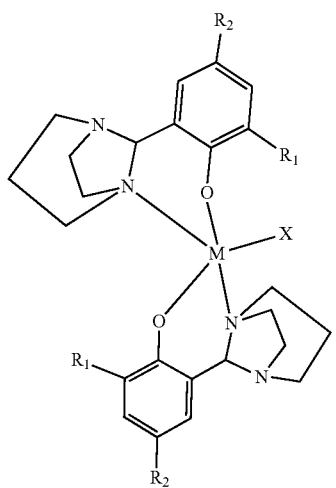

were prepared by dissolving two equivalents of the ligand in toluene or diethyl ether and cooling the solution to about −30° C. Using an autopipette, benzylmagnesium chloride, ″BuLi or the like (two equivalents) was then added and the solution was left stirring at room temperature for about one hour. The solution was then cooled again to about −30° C. and one equivalent of the desired MCl$_3$ or MCl$_3$(solvent)$_3$ adduct (e.g., VCl$_3$(THF)$_3$ and the like) was added as solid and the mixture stirred for about 16 hours. The solution was then filtered and the solvent removed in vacuo. The solids obtained were then washed with a minimum amount of pentane and once again dried in vacuo to produce the transition metal compound.

Exemplary Preparation of Catalyst Compounds
2-(1,5-diazabicyclo[3.2.1]octan-8-yl)-4,6-di-tert-butylphenol

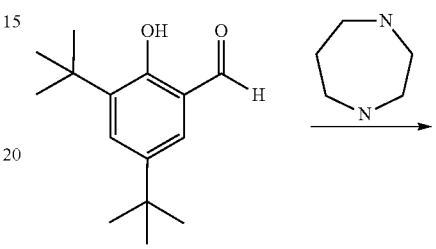

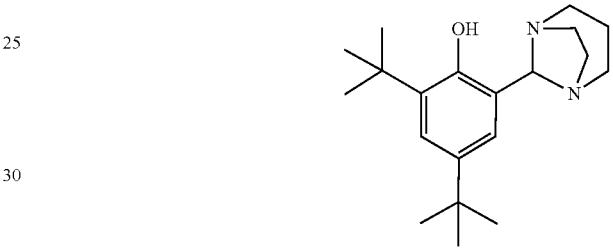

3,5-di-tert-butyl-2-hydroxybenzaldehyde (2.0 g, 8.53 mmol) and 1,4 diazacycloheptane (homopiperazine, 940 mg, 9.38 mmol) were dissolved in 100 mL of methanol. A precipitate formed within 10 minutes. The reaction was allowed to stir at ambient temperature for 2 hours, then filtered to collect the white solid product in 58% yield. $^1$H NMR (400 MHz, CDCl$_3$, δ): 1.28 (s, 9H), 1.33 (m, 1H), 1.42 (s, 9H), 2.00 (m, 1H), 3.03 (m, 6H), 3.34 (m, 2H), 5.15 (s, 1H), 7.20 (s, 1H), 7.26 (m, 1H).

Cp*Hf(tBuL)Cl$_2$

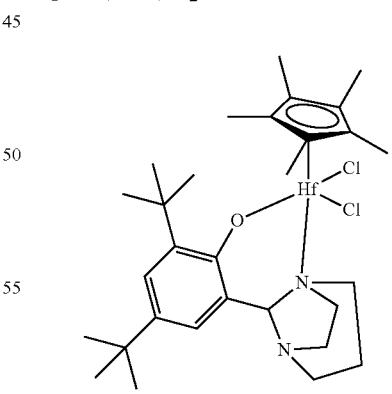

50 mg of 2-(1,5-diazabicyclo[3.2.1]octan-8-yl)-4,6-di-tert-butylphenol ligand in 1 mL toluene was cooled to −30° C. Using an autopipette, 165 uL benzylmagnesium chloride (1M in Et$_2$O) was added and the solution was left stirring at room temperature for one hour. The solution was then cooled to −30° C. and Cp*HfCl$_3$ was added as solid. After 16 hours, the solution was filtered. The solvent was removed in vacuo and the solids were washed with minimum pentane. The solids were then dried in vacuo to yield the compound as yellow powder (65 mg, 59% yield). The ¹H NMR (400 MHz, CDCl3) is shown in FIG. 1.

Zr(tBuL)₂Cl₂

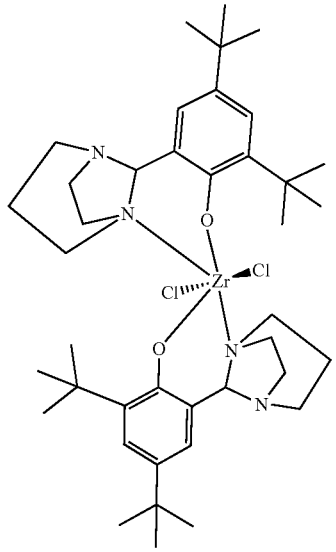

Figure 2:
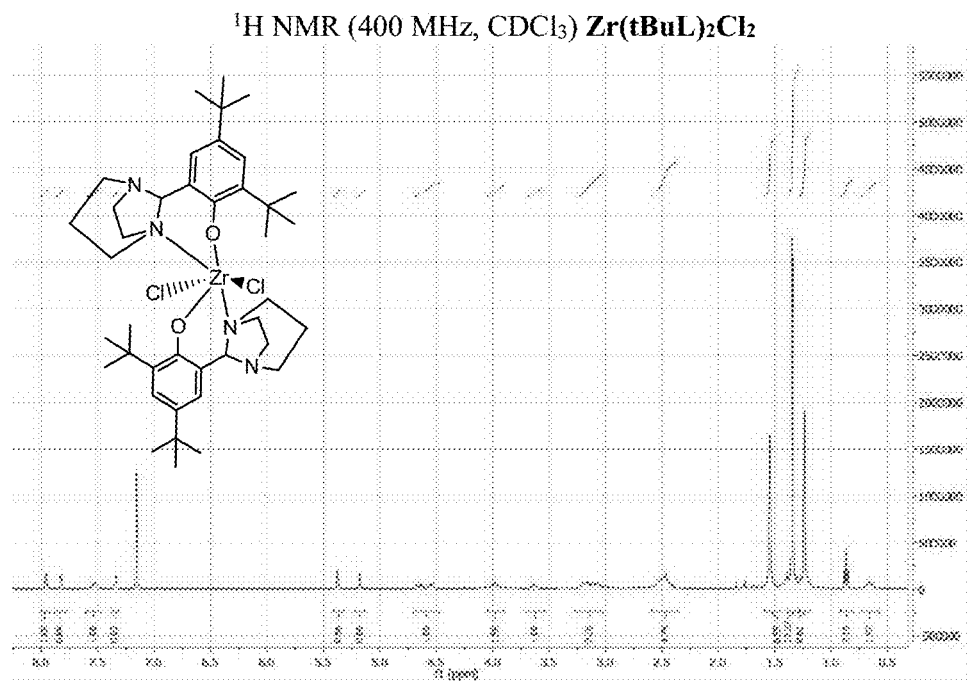
FIG. 2 shows a $^1$H NMR spectrum of a catalyst compound according to embodiments disclosed herein.

50 mg of 2-(1,5-diazabicyclo[3.2.1]octan-8-yl)-4,6-di-tert-butylphenol ligand in 4 mL dichloromethane was cooled to −30° C. Using an autopipette, ⁿBuLi (66 uL) was added and the solution was left stirring at room temperature for one hour. The solution was then cooled to −30° C. and ZrCl₄(Et₂O)₂ (30 mg) was added as solid. After 16 hours, the solution was filtered. The solvent was removed in vacuo and the solids were washed with minimum pentane. The solids were then dried in vacuo to give the compound as bright yellow powder (44 mg, 70% yield). The ¹H NMR (400 MHz, CDCl3) is shown in FIG. 2.

3-(1,5-diazabicyclo[3.2.1]octan-8-yl)-[1,1'-biphenyl]-2-ol

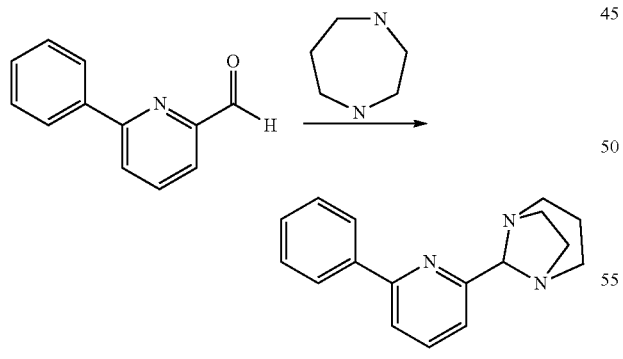

2-hydroxy-[1,1'-biphenyl]-3-carbaldehyde (2.5 g, 12.6 mmol) and homopiperazine (1.26 g, 12.6 mmol) were dissolved in 50 mL of methanol, causing a precipitate to form in about 10 minutes. After 2 hours at ambient temperature, the solid was collected and washed with pentane to give the product in 63% yield. ¹H NMR (400 MHz, CDCl₃, δ): 1.26 (m, 1H), 1.96 (m, 1H), 2.98 (m, 6H), 3.30 (m, 2H), 5.19 (s, 1H), 6.79 (m, 1H), 7.23 (m, 2H), 7.34 (m, 3H), 7.51 (m, 2H); ¹³C NMR (CDCl₃, δ): 18.3, 49.6 (2C), 54.3 (2C), 88.1, 118.6, 120.8, 126.1, 126.6, 127.9 (2C), 129.1, 129.3 (2C), 130.5, 138.7, 154.7.

V(PhL)₂Cl

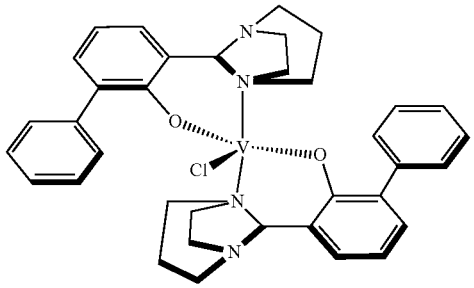

Figure 3:
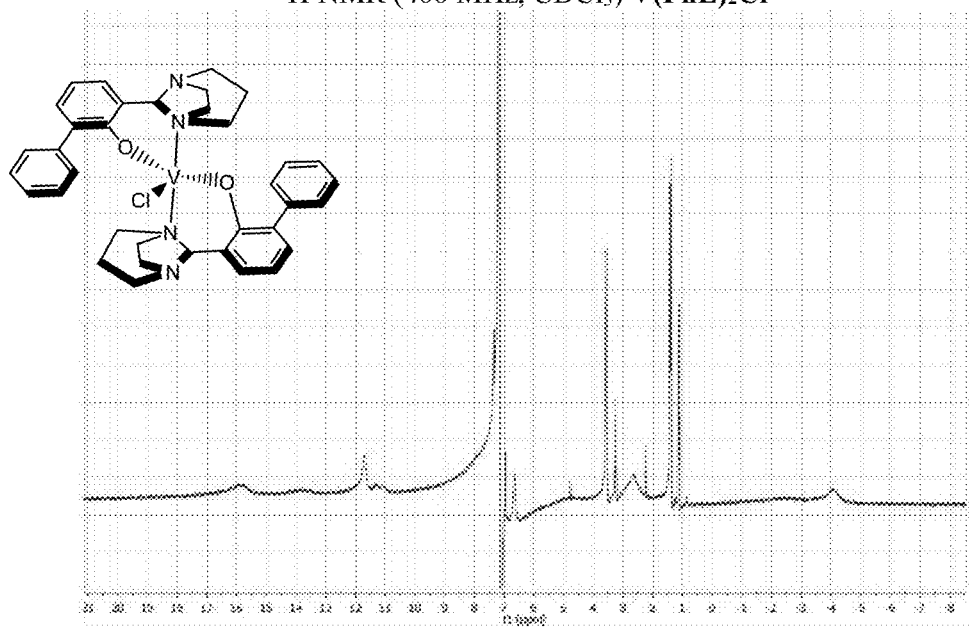
FIG. 3 shows a $^1$H NMR spectrum of a catalyst compound according to embodiments disclosed herein.

2-hydroxy-[1,1'-biphenyl]-3-carbaldehyde ligand (56 mg) in 5 mL diethyl ether was cooled to −30° C. Using an autopipette, ⁿBuLi (84 uL) was added and the solution was left stirring at room temperature for one hour. The solution was then cooled to −30° C. and VCl₃(THF)₃ (37 mg) was added as solid. After 16 hours, the solution was filtered. The solvent was removed in vacuo and the solids were washed with minimum pentane. The solids were then dried in vacuo to give the paramagnetic yellow/green powder (32 mg, 49% yield). The ¹H NMR (400 MHz, CDCl₃) is shown in FIG. 3.

Al(PhL)Cl₂

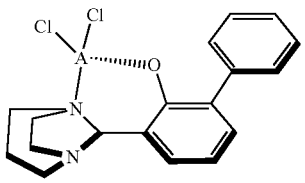

Figure 4:
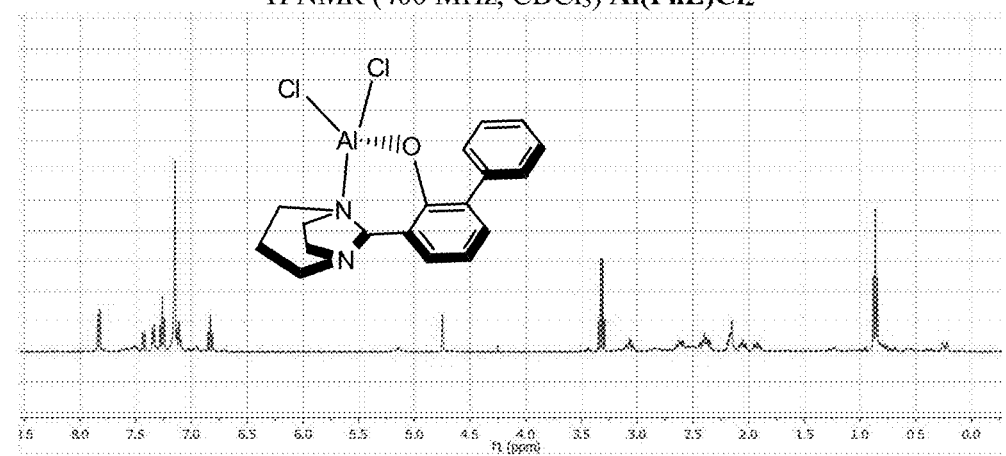
FIG. 4 shows a $^1$H NMR spectrum of a catalyst compound according to embodiments disclosed herein.

2-hydroxy-[1,1'-biphenyl]-3-carbaldehyde ligand (50 mg) in 6 mL diethyl ether was cooled to −30° C. Using an autopipette, ⁿBuLi (73 uL) was added and the solution was left stirring at room temperature for one hour. The solution was then cooled to −30° C. and AlCl₃ (24 mg) was added as solid. After 16 hours, the solution was filtered. The solvent was removed in vacuo and the solids were washed with minimum pentane. The solids were then dried in vacuo to give the white crystalline powder (55 mg, 81% yield). The ¹H NMR (400 MHz, CDCl₃) is shown in FIG. 4.

Al(PhL)(ethyl)Cl

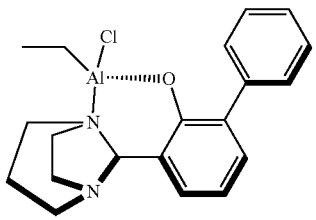

Figure 5:
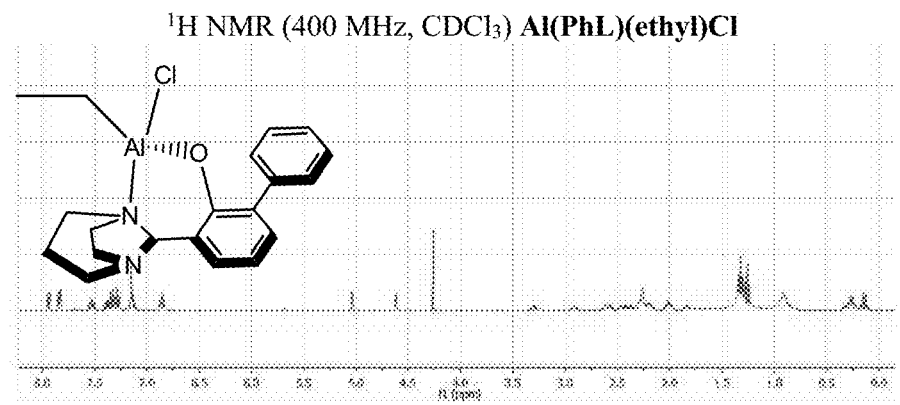
FIG. 5 shows a $^1$H NMR spectrum of a catalyst compound according to embodiments disclosed herein.

2-hydroxy-[1,1'-biphenyl]-3-carbaldehyde ligand (20 mg) in 1 mL dichloromethane was cooled to −30° C. A cold dichloromethane solution of diethyl aluminum chloride (9 mg) was added and the solution was left stirring at room temperature for one hour. The solution was then cooled to −30° C., pentane was added, and the white precipitate was isolated by decanting the mother liquor (24 mg, 53% yield). The ¹H NMR (400 MHz, CDCl3) is shown in FIG. 5.

O=V(PhL)$_2$

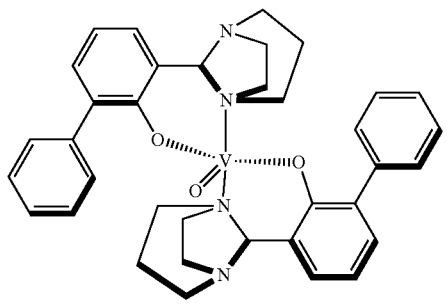

Figure 6:
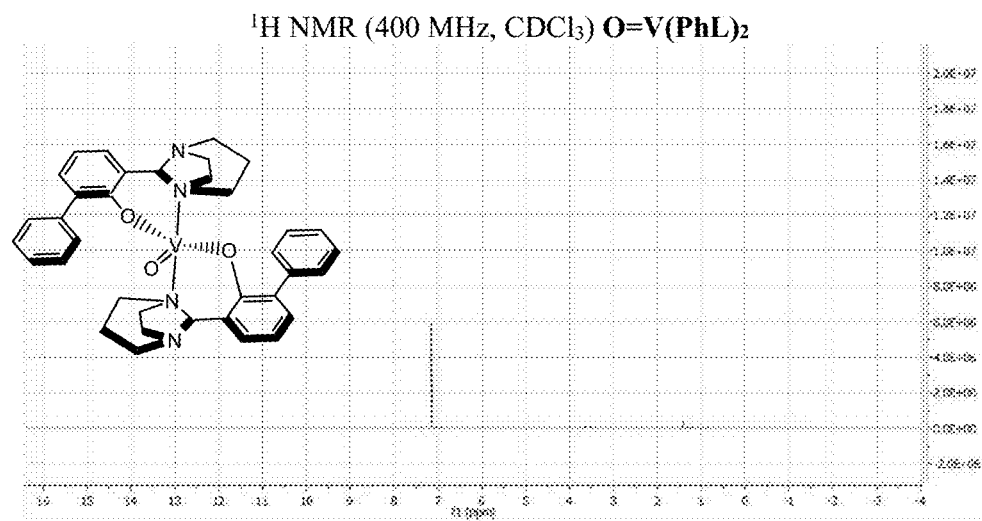
FIG. 6 shows a $^1$H NMR spectrum of a catalyst compound according to embodiments disclosed herein.

2-hydroxy-[1,1'-biphenyl]-3-carbaldehyde ligand (30 mg) in 4 mL diethyl ether was cooled to −30° C. Using an autopipette, "BuLi (one equivalent, 47 uL) was added and the solution was left stirring at room temperature for one hour. The solution was then cooled to −30° C. and O=VCl$_3$(THF)$_2$ (34 mg) was added as solid. After 16 hours, the solution was filtered. The solvent was removed in vacuo and the solids were washed with minimum pentane. The solids were then dried in vacuo to give the paramagnetic NMR silent blue/green powder (25 mg, 37% yield). The $^1$H NMR (400 MHz, CDCl$_3$) is shown in FIG. 6.

Exemplary Ethylene and Ethylene-Octene Hight Through Put Polymerization Propylene Copolymerization Procedure High throughput polymerization evaluations were conducted according to the following exemplary procedure: a pre-weighed glass vial insert and disposable stirring paddle were fitted to each reaction vessel of the reactor, which contains 48 individual reaction vessels. The vials were charged with 500 equivalents of MAO. The reactor was then closed, and ethylene gas was introduced to each vessel to purge the nitrogen out of the system. If any modules receive hydrogen, it was added during the purge process. The solvent (typically isohexane) was added next according to the set total reaction volume, including the following additions to a total volume of about 5 mL. The scavenger and/or other components as indicated were then added. The contents of the vessels were stirred at 800 rpm. The ethylene was added as a gas to a set pressure of 100 psi. The reactor vessels were heated to their set run temperature of 80° C. as indicated. Octene was added as indicated as a gas to a pre-determined pressure above the pressure of the ethylene while the reactor vessels were heated to the indicated polymerization reaction temperature.

A toluene solution of catalyst (typically at a concentration of 0.2 mmol/L in toluene which provides about 15 nmol of catalyst) was injected into the reactors. The reaction was then allowed to proceed until a pre-determined amount of pressure had been taken up by the reaction. Alternatively, the reaction may be allowed to proceed for a set amount of time as indicated. The reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by GPC as indicated herein to determine the molecular weight and by DSC as described herein to determine the melting point.

For purposes herein, determination of various molecular weight related values was conducted by GPC, high temperature size exclusion chromatography, performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 µL of a polymer solution was injected into the system. The concentration of the polymer in the eluent was monitored using a Polymer Char IR4 detector. The molecular weights presented are relative to linear polystyrene standards and are uncorrected.

Differential Scanning Calorimetry Peak melting point, (Tm, also referred to as melting point), peak crystallization temperature (Tc, also referred to as crystallization temperature), glass transition temperature (Tg), heat of fusion (Hf), and percent crystallinity were determined using the following DSC procedure according to ASTM D3418-03.

Differential scanning calorimetric (DSC) data were obtained using a TA Instruments model Q2100 instrument. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −70° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided, however, that a value of 189 J/g is used as the heat of fusion for 100% crystalline polypropylene, a value of 290 J/g is used for the heat of fusion for 100% crystalline polyethylene. The melting and crystallization temperatures reported here were obtained during the first cooling/second heating cycle unless otherwise noted.

The molecular weight, comonomer composition, and the presence of long chain branching was determined by GPC-4D (GPC-IR with multiple detectors as follows. These data, including the amount of ethylene incorporated in the polymers (weight %), are presented in Table 1.

GPC 4D Procedure:

The distribution and the moments of molecular weight ($M_w$, $M_n$, $M_w/M_n$, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector, and a viscometer. Three Agilent PLgel 10-µm Mixed-B LS columns are used to provide polymer separation. Aldrich reagent grade 1,2,4-tri chlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 ml/min and the nominal injection volume is 200 µl. The whole system including transfer lines, columns, and detectors is contained in an oven maintained at 145° C. The polymer sample is weighed and sealed in a standard vial with 80 µL of a flow marker (Heptane) added to it. After loading the vial in the autosampler, polymer is automatically dissolved in the instrument with 8 ml of added TCB solvent. The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation:

$c=\beta I$, where $\beta$ is the mass constant.

The mass recovery is calculated from the ratio of the integrated area of the concentration chromatography over elution volume and the injection mass which is equal to the pre-determined concentration multiplied by injection loop volume. The conventional molecular weight (IR MW) is determined by combining the universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. Macromolecules 2001, v. 34, 6812), except that for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and a is 0.695 and K is $0.000579*(1-0.0077*w2b)$ for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the number of methyl substitutions per 1,000 total carbons ($CH_3$/1000 TC) as a function of molecular weight. The short-chain branch (SCB) content per 1000 TC (SCB/1000 TC) is then computed as a function of molecular weight by applying a chain-end correction to the $CH_3$/1000 TC function, assuming each chain to be linear and terminated by a methyl group at each end. The wt % of comonomer is then obtained from the following expression in which/is 0.3, 0.4, 0.6, 0.8, and so on for $C_3$, $C_4$, $C_6$, $C_8$, and so on co-monomers, respectively:

$w2=f*SCB/1000TC.$

The bulk composition of the polymer from the GPC-IR and GPC-4D analyses is obtained by considering the entire signals of the $CH_3$ and $CH_2$ channels between the integration limits of the concentration chromatogram. First, the Bulk IR ratio is obtained according to the following equation:

$$\text{Bulk } IR \text{ ratio} = \frac{\text{Area of CH}_3 \text{ signal within integration limits}}{\text{Area of CH}_2 \text{ signal within integration limits}}.$$

Next, the same calibration of the $CH_3$ and $CH_2$ signal ratio, as mentioned previously in obtaining the $CH_3$/1000 TC as a function of molecular weight, is applied to obtain the bulk $CH_3$/1000 TC. A bulk methyl chain ends per 1000 TC (bulk $CH_3$ end/1000 TC) is obtained by weight-averaging the chain-end correction over the molecular-weight range. It then follows that:

$w2b=f*\text{bulk CH}_3/1000TC$ bulk $SCB/1000TC=$bulk $CH_3/1000TC-$bulk $CH_3$end/1000TC and bulk SCB/1000 TC is converted to bulk w2 in the same manner as described above.

The LS detector employed is the 18-angle Wyatt Technology High Temperature DAWN HELEOSII™. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.) according to the following relationship:

$$\frac{K_o c}{\Delta R(\theta)} = \frac{1}{MP(\theta)} + 2A_2 c.$$

Wherein $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system, as determined by the equation:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda=665$ nm. For analyzing polyethylene homopolymers, ethylene-hexene copolymers, and ethylene-octene copolymers, dn/dc=0.1048 ml/mg and $A_2=0.0015$; for analyzing ethylene-butene copolymers, dn/dc=0.1048*(1−0.00126*w2) ml/mg and $A_2=0.0015$ where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the equation $[\eta]=\eta s/c$, where c is concentration and is determined from the IR5 broadband channel output. The viscosity MW at each point is calculated as $M=K_{PS}M^{\alpha_{PS}+1}/[\eta]$ where $\alpha_{ps}$ is 0.67 and $K_{ps}$ is 0.000175.

The branching index ($g'_{vis}$) is calculated using the output of the GPC-IR5-LS-VIS according to the following: the average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as:

$$g'_{vis} = \frac{[\eta]_{avg}}{KM_v^\alpha}$$

where $M_v$ is the viscosity-average molecular weight based on molecular weights determined by LS analysis and the K and a are for the reference linear polymer, which are, for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, a is 0.695 and K is $0.000579*(1-0.0075*w2b)$ for ethylene-hexene copolymer where w2b is a bulk weight percent of hexene comonomer, and a is 0.695 and K is $0.000579*(1-0.0077*w2b)$ for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

All molecular weights are weight average unless otherwise noted. All molecular weights are reported in g/mol unless otherwise noted.

In the event of conflict between the GPC-4D procedure and the "Rapid GPC," the GPC-4D procedure immediately above shall be used.

The following exemplary transition metal compounds A, B, and C were prepared according to the procedures above.

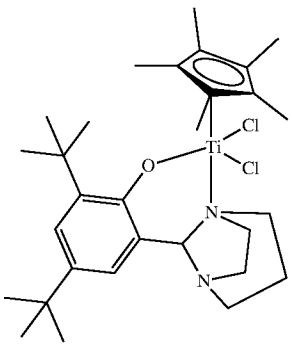

(A)

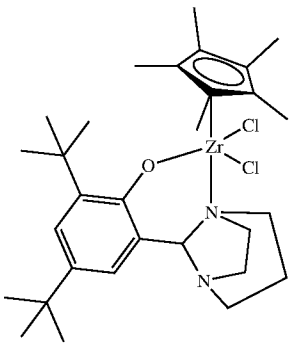

(B)

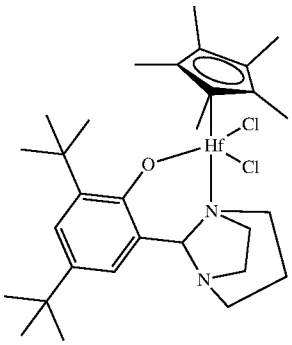

(C)

The polymerization activity of the examples were evaluated using high throughput polymerization screening utilizing 0.05 μmol (5.00E-08 mol) catalyst, 500 eq. MAO at 80° C., according to the procedure described herein. The results are presented in Table 1.

TABLE 1

Ethylene and ethylene-octene polymerization
0.05 μmol catalyst at 100 PSI ethylene, 500 eq. MAO, 80° C.

| Ex. | Cat | Time (s) | Octene | Mw (g/mol) | Mn (g/mol) | Mw/Mn | Yield (g) | # of chains per cat | Activity $g_{(polymer)}/g_{(cat)}$ | Activity (kg/mol hr) |
|---|---|---|---|---|---|---|---|---|---|---|
| 1 | A | 1800 | N | 1287162 | 298102 | 4.3 | 0.0226 | 1.5 | 847 | 9040 |
| 2 | A | 1800 | Y | — | — | — | 0.008 | — | 300 | 3200 |
| 3 | B | 1003 | N | 902479 | 202803 | 4.5 | 0.046 | 4.5 | 1595 | 33021 |
| 4 | B | 1055 | Y | 726016 | 163036 | 4.5 | 0.039 | 4.8 | 1352 | 26616 |
| 5 | C | 1800 | N | 1118591 | 277788 | 4.0 | 0.0214 | 1.5 | 645 | 8560 |
| 6 | C | 1800 | Y | — | — | — | 0.0046 | — | 139 | 1840 |

"—"indicates insufficient material for analysis

As these data confirm, the catalyst provide significant polymerization activity.

The following exemplary transition metal compounds D, E, and F were prepared according to the procedures above.

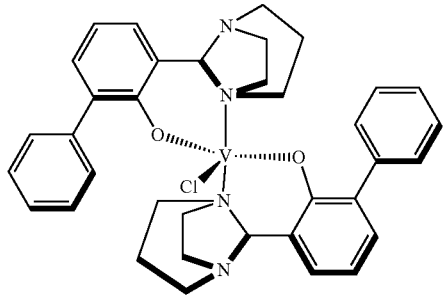

(D)

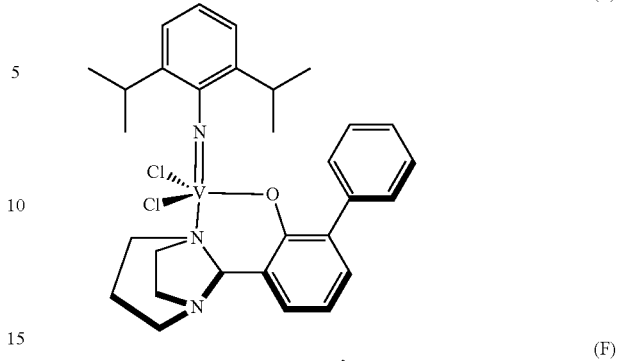

(E)

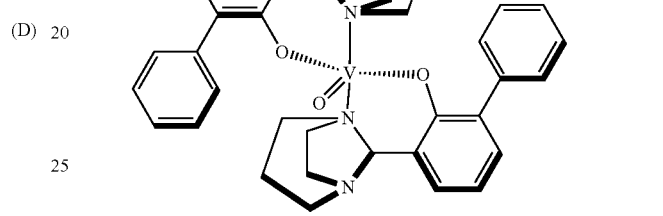

(F)

The polymerization activity of the examples were evaluated using high throughput polymerization screening utilizing 0.05 μmol (5.00E-08 mol) catalyst, 500 eq. MAO, 85 psi ethylene at 50° C. according to the procedure described herein. The results are presented in Table 2.

TABLE 2

Ethylene and ethylene-octene polymerization
0.05 μmol catalyst at 85 PSI ethylene, 500 eq. MAO, 50° C.

| Ex. | Cat | Time (s) | Octene | Mw (g/mol) | Mn (g/mol) | Mw/Mn | Yield (g) | # of chains per cat | Activity $g_{(polymer)}/g_{(cat)}$ | Activity (kg/mol hr) |
|---|---|---|---|---|---|---|---|---|---|---|
| 7 | D | 1800 | N | 2143572 | 551289 | 3.9 | 0.0417 | 1.5 | 1447 | 16680 |
| 8 | D | 1800 | Y | — | — | — | 0.0083 | — | 288 | 3320 |
| 9 | E | 794 | N | 2454803 | 1067132 | 2.3 | 0.0528 | 1.0 | 1637 | 47855 |
| 10 | E | 1034 | Y | 2815327 | 1847240 | 1.5 | 0.0345 | 0.4 | 1070 | 24023 |
| 11 | F | 1800 | N | 2159991 | 561016 | 3.9 | 0.0214 | 0.8 | 10.26 | 8560 |
| 12 | F | 1800 | Y | 2824328 | 1586006 | 1.8 | 0.013 | 0.2 | 632 | 5200 |

"—" indicates insufficient material for analysis

The following exemplary transition metal compounds G, H, I J, K, L, and M were prepared according to the procedures above.

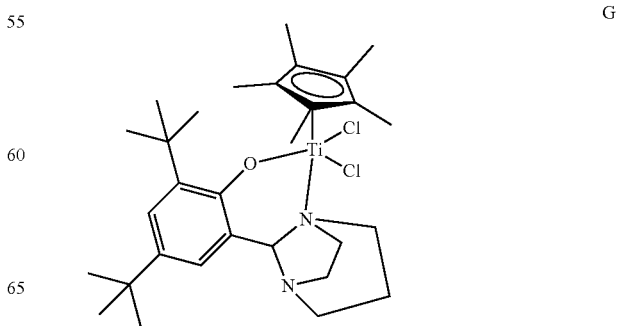

G

J
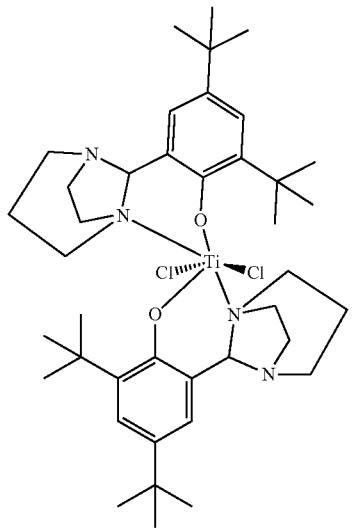
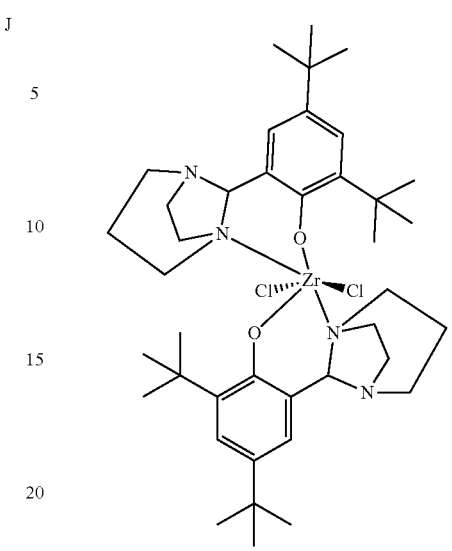
K
M
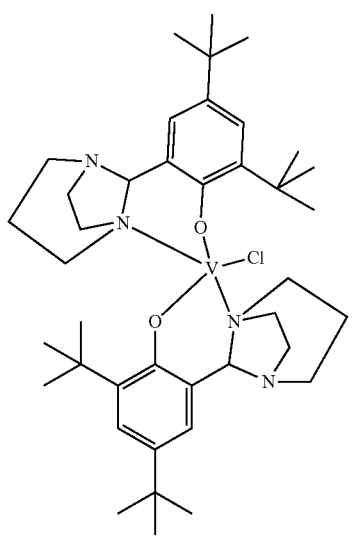
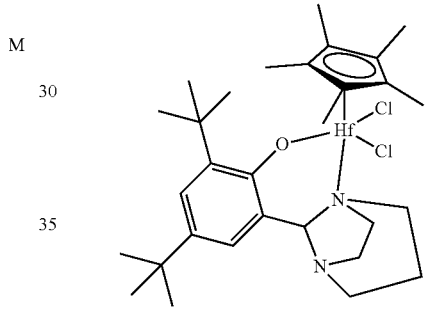
I
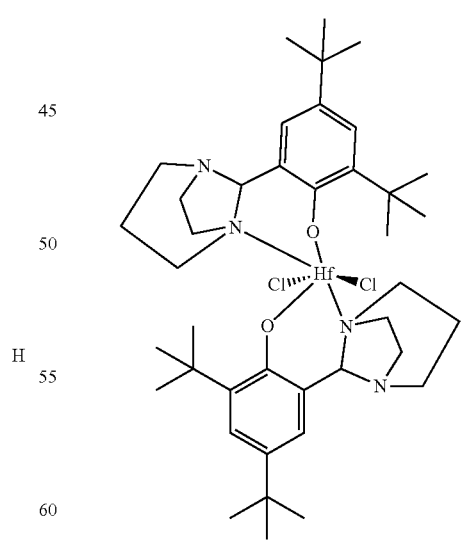
L
H
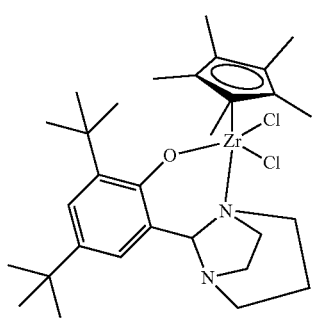
The polymerization activity of the examples were evaluated using high throughput polymerization screening utilizing 0.05 μmol (5.00E-08 mol) catalyst, 500 eq. MAO, 100 psi ethylene at 80° C. according to the procedure described herein. The results are presented in Table 3.

TABLE 3

Ethlylene and ethylene-octene polymerization
0.05 μmol catalyst at 85 PSI ethylene, 500 eq. MAO, 80° C.

| Ex. | Cat | Time (s) | Octene | Mw (g/mol) | Mn (g/mol) | Mw/Mn | Yield (g) | Activity $g_{(polymer)}/g_{(cat)}$ | Activity (kg/mol hr) |
|---|---|---|---|---|---|---|---|---|---|
| 13 | G | 1800 | N | 1,714,000 | 798,777 | 2.1 | 0.04 | 1,405 | 16,000 |
| 14 | G | 1800 | Y | 1,125,500 | 639,224 | 1.8 | 0.025 | 878 | 10,000 |
| 15 | H | 1800 | N | 1,432,333 | 688,487 | 2.1 | 0.032 | 1,044 | 12,800 |
| 16 | H | 1800 | Y | 1,682,667 | 719,964 | 2.3 | 0.029 | 946 | 11,600 |
| 17 | I | 1800 | N | — | — | — | 0.008 | 229 | 3,200 |
| 18 | I | 1800 | Y | — | — | — | 0.006 | 171 | 2,400 |
| 19 | J | 1800 | N | 1,953,000 | 598,901 | 3.2 | 0.021 | 560 | 8,400 |
| 20 | J | 1800 | Y | 1,843,000 | 588,887 | 3.1 | 0.015 | 400 | 6,000 |
| 21 | K | 1800 | N | — | — | — | 0.008 | 202 | 3,200 |
| 22 | K | 1800 | Y | — | — | — | 0.008 | 202 | 3,200 |
| 23 | L | 1800 | N | — | — | — | 0.003 | 68 | 1,200 |
| 24 | L | 1800 | Y | — | — | — | 0.002 | 45 | 800 |
| 25 | M | 1800 | N | — | — | — | 0.003 | 84 | 1,200 |
| 26 | M | 1800 | Y | — | — | — | 0.003 | 84 | 1,200 |

"—"indicates insufficient material for analysis

As these data show, the inventive catalysts systems produce ethylene polymers and copolymers having improved properties at significant polymerization rates.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A catalyst compound represented by the Formula (I):

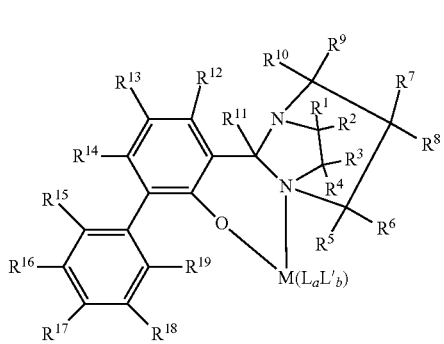

(I)

where:
M is a Group 3-13 metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-2;
b is greater than or equal to 0 and less than or equal to Z-2;
and Z-2-(a)-(2b)=0;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof.

2. The catalyst compound according to claim 1, wherein M is a metal selected from Groups 4, 5 or 13 of the periodic table of the elements.

3. The catalyst compound according to claim 1, wherein M is Ti, Hf, Zr, or V.

4. The catalyst compound according to claim 1, represented by the Formula (II):

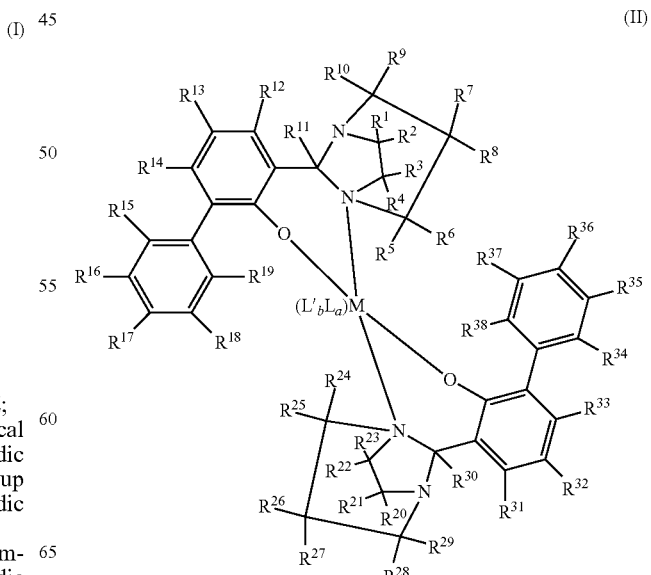

(II)

where:

M is a Group 3-12 transition metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-4;

b is greater than or equal to 0 and less than or equal to Z-4;

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$ $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof.

5. The catalyst compound according to claim 1, represented by the Formula (IIa):

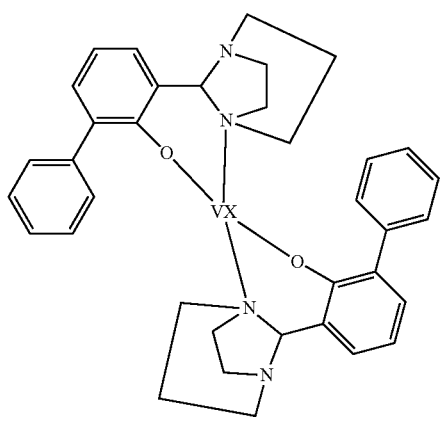

(IIa)

wherein V is vanadium in the 3+ oxidation state, and X is a halogen, $C_1$-$C_{10}$ alkyl, benzyl, —SiR$^{\#}_3$, —CONR$^{\#}_2$, —NR$^{\#}_2$, and/or —OR$^{\#}$, wherein each $R^{\#}$ is a $C_1$-$C_{10}$ hydrocarbyl.

6. The catalyst compound according to claim 1, represented by the Formula (IIb):

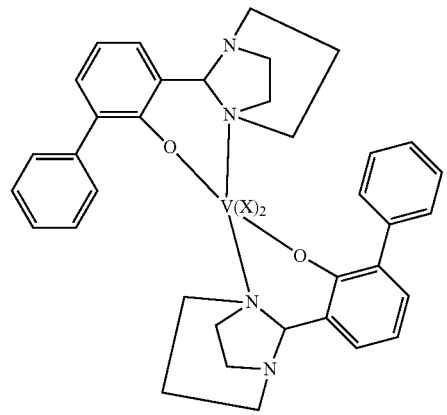

(IIb)

wherein V is vanadium and each X is a halogen, $C_1$-$C_{10}$ alkyl, benzyl, —SiR$^{\#}_3$, —CONR$^{\#}_2$, —NR$^{\#}_2$, and/or —OR$^{\#}$, wherein each $R^{\#}$ is a $C_1$-$C_{10}$ hydrocarbyl.

7. The catalyst compound according to claim 1, represented by the Formula (III):

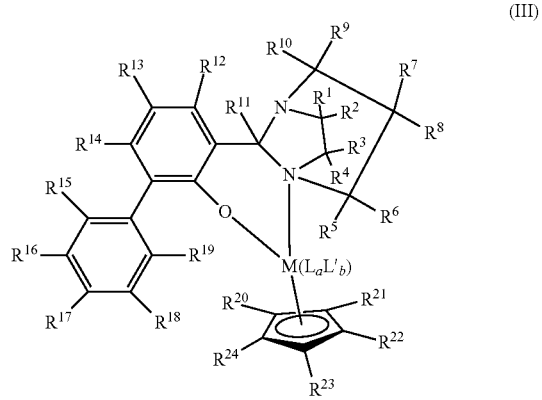

(III)

where:

M is a Group 3-12 transition metal having a valance equal to Z;

each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;

each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;

a is greater than or equal to 0 and less than or equal to Z-4;

b is greater than or equal to 0 and less than or equal to Z-4;

and Z-4-(a)-(2b)=0;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, and $R^{24}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof.

8. The catalyst compound according to claim 1, represented by the Formula (IV):

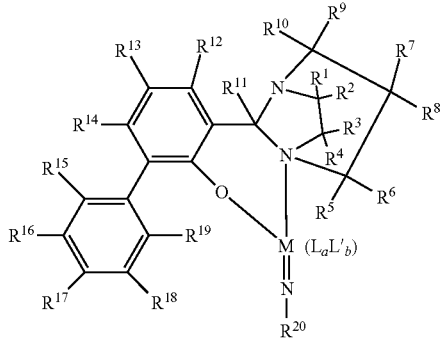

(IV)

where:
M is a Group 3-12 transition metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-4;
b is greater than or equal to 0 and less than or equal to Z-4;
and Z-4-(a)-(2b)=0;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof; and
$R^{20}$ is, a $C_1$-$C_{40}$ hydrocarbyl radical, a functional group comprising elements from Group 13-17 of the periodic table of the elements, or a combination thereof.

9. The catalyst compound according to claim 8, represented by the Formula (V):

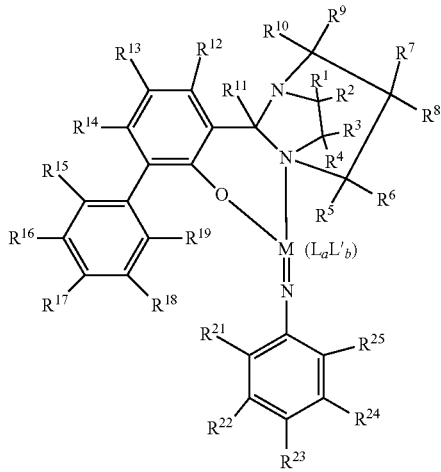

(V)

where:
M is a Group 3-12 transition metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-4;
b is greater than or equal to 0 and less than or equal to Z-4;
and Z-4-(a)-(2b)=0;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{21}$, $R^{22}$, $R^{23}$, $R^{24}$, and $R^{25}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof.

10. The catalyst compound according to claim 8, represented by the Formula (Va):

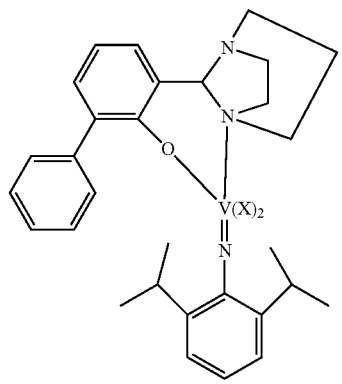

(Va)

wherein V is vanadium and each X is a halogen, $C_1$-$C_{10}$ alkyl, benzyl, —SiR$^\#_3$, —CONR$^\#_2$, —NR$^\#_2$, and/or —OR$^\#$, wherein each $R^\#$ is a $C_1$-$C_{10}$ hydrocarbyl.

11. The catalyst compound according to claim 1, represented by the Formula (VI):

(VI)

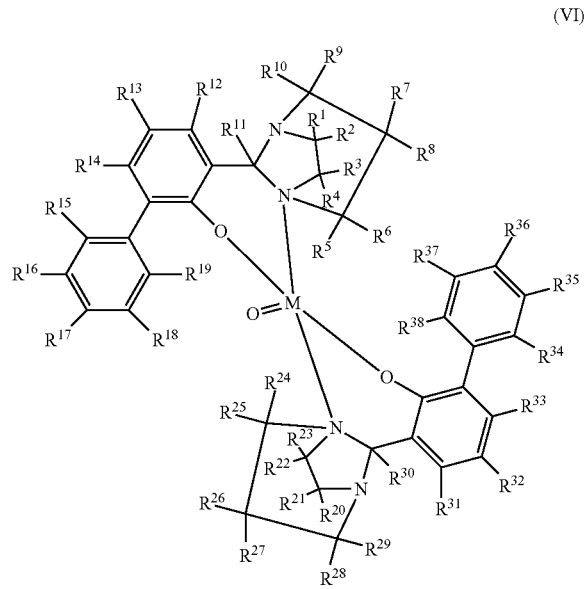

where:
M is a Group 5 transition metal; and
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$ and $R^{38}$ is, independently, a hydrogen, a $C_1$-$C_{40}$ hydrocarbyl radical, a functional group comprising elements from Group 13-17 of the periodic table of the elements, or two or more of $R^1$ to $R^{19}$ and/or two or more of $R^{20}$ to $R^{38}$ are independently optionally joined together to form a $C_4$ to $C_{62}$ cyclic or polycyclic ring structure, or a combination thereof.

12. The catalyst compound according to claim 1, represented by the Formula (VIa):

(VIa)

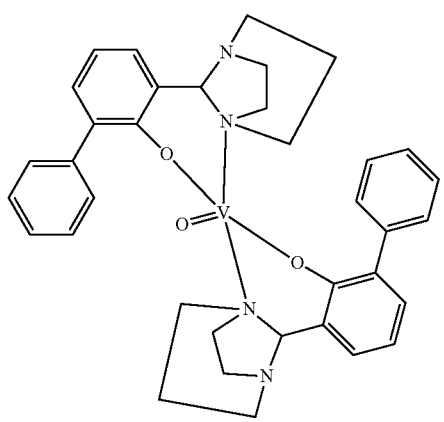

wherein V is vanadium.

13. A process for producing a copolymer, comprising:
contacting one or more $C_2$ to $C_{20}$ olefin monomers with a catalyst system comprising a catalyst compound, activator, and optionally a support at a temperature, a pressure, and for a period of time sufficient to produce the polymer, the catalyst compound represented by Formula (I):

(I)

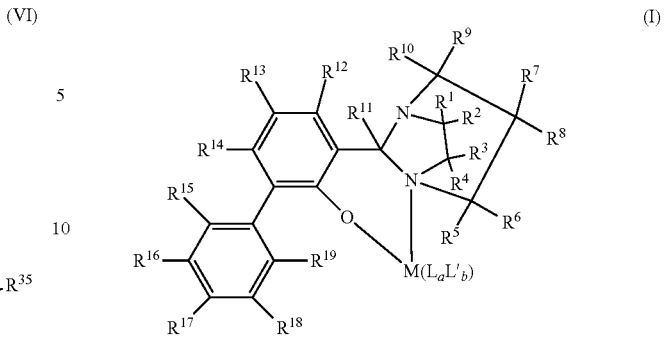

where
M is a Group 3-13 metal having a valance equal to Z;
each L is a univalent $C_1$ to $C_{40}$ hydrocarbyl radical comprising elements from Groups 13-17 of the periodic table of the elements, a univalent functional group comprising elements from Groups 13-17 of the periodic table of the elements, or a combination thereof;
each L' is a divalent $C_1$ to $C_{40}$ hydrocarbyl radical comprising elements from Groups 13-17 of the periodic table of the elements, a divalent functional group comprising elements from Groups 13-17 of the periodic table of the elements, or a combination thereof;
a is greater than or equal to 0 and less than or equal to Z-2;
b is greater than or equal to 0 and less than or equal to Z-2;
and Z-2-(a)-(2b)=0;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is, independently, a hydrogen, a $C_1$-$C_{40}$ hydrocarbyl radical, a functional group comprising elements from Group 13-17 of the periodic table of the elements, or two or more of $R^1$ to $R^{19}$ are independently optionally joined together to form a $C_4$ to $C_{62}$ cyclic or polycyclic ring structure, or a combination thereof.

14. The process of claim 13, wherein the catalyst, the activator, or both are disposed on a support, wherein the support comprises silica, alumina, clay, or a combination thereof.

15. The process of claim 13, wherein the activator comprises alumoxane, a non-coordinating anion activator, or a combination thereof.

16. The process of claim 13, wherein the activator comprises alumoxane and the alumoxane is present at a ratio of 1 mole aluminum or more to mole of catalyst compound.

17. The process of claim 13, wherein the activator is represented by the formula:

$$(Z)_d^+(A^{d-})$$

wherein Z is (L-H) or a reducible Lewis Acid, wherein L is a neutral Lewis base, H is hydrogen, and $(L-H)^+$ is a Bronsted acid, or Z is a reducible Lewis acid represented by the formula: $(Ar_3C^+)$, where Ar is aryl radical, an aryl radical substituted with a heteroatom, an aryl radical substituted with one or more $C_1$ to $C_{40}$ hydrocarbyl radicals, an aryl radical substituted with one or more functional groups comprising elements from Groups 13-17 of the periodic table of the elements, or a combination thereof;
$A^{d-}$ is a non-coordinating anion having the charge d–; and
d is an integer from 1 to 3.

18. The process of claim 13, wherein the activator is selected from the group consisting of:

N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(tert-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(tert-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-tert-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(tert-butyl)ammonium tetraphenylborate,
N,N-dimethylanilinium tetraphenylborate,
N,N-di ethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-di ethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(tert-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(tert-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis (3,5-bis(trifluoromethyl)phenyl) borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine,
triphenylcarbenium tetrakis(3,5-bis(trifluoromethyl)phenyl)borate), and combinations thereof.

19. The process of claim 13, wherein the olefin comprises from 2 to 12 carbon atoms.

20. The process of claim 13, wherein the catalyst has an activity of greater than or equal to about 100 g(polymer)/g (catalyst) and the polymer produced comprises a Mw of greater than or equal to about 100,000 g/mol, a polydispersity of less than or equal to 10, or a combination thereof.

* * * * *